(12) United States Patent
Ezra et al.

(10) Patent No.: US 11,108,684 B1
(45) Date of Patent: Aug. 31, 2021

(54) SATISFYING A SET OF SERVICES OVER GIVEN NETWORK RESOURCES

(71) Applicant: ECI Telecom Ltd., Petah-Tikva (IL)

(72) Inventors: Shirel Ezra, Moshav gane tal d.n nachal sorek (IL); Efraim Gelman, Ramat Gan (IL); Inbal Hecht, Petah Tikva (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

(21) Appl. No.: 17/061,228

(22) Filed: Oct. 1, 2020

Related U.S. Application Data

(63) Continuation of application No. PCT/IB2020/057587, filed on Aug. 12, 2020.

(51) Int. Cl.
*H04L 12/725* (2013.01)
*H04L 12/703* (2013.01)
*H04L 12/753* (2013.01)

(52) U.S. Cl.
CPC ............ *H04L 45/302* (2013.01); *H04L 45/28* (2013.01); *H04L 45/48* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,310,883 B1 * | 10/2001 | Mann | ...................... | H04L 45/12 370/408 |
| 6,538,991 B1 * | 3/2003 | Kodialam | ........... | H04L 41/5003 370/229 |
| 2002/0067693 A1 * | 6/2002 | Kodialam | ............... | H04L 45/12 370/216 |
| 2004/0190441 A1 * | 9/2004 | Alfakih | ............... | H04L 41/0668 370/216 |
| 2005/0278453 A1 * | 12/2005 | Cherkasova | .......... | H04L 67/322 709/231 |
| 2011/0066300 A1 * | 3/2011 | Tyagi | ........................ | H02J 3/14 700/291 |
| 2016/0094450 A1 * | 3/2016 | Ghanwani | ............... | H04L 47/22 370/235 |
| 2016/0218948 A1 * | 7/2016 | Djukic | ................ | H04L 43/0876 |
| 2018/0012164 A1 * | 1/2018 | Gopalakrishnan | ......................... | G06Q 10/06313 |

* cited by examiner

*Primary Examiner* — Xavier S Wong
(74) *Attorney, Agent, or Firm* — Finnegan, Henderson, Farabow, Garrett & Dunner, LLP

(57) ABSTRACT

Techniques for satisfying a plurality of service demands in a data communication network are disclosed. Aspects include identifying a first plurality of edges, each of which connects two of a plurality of nodes in the data communication network, wherein each of the first plurality of edges is associated with one of a plurality of unprotected service demands; generating a spanning tree comprising a second plurality of edges selected from the first plurality of edges, wherein the spanning tree connects all of the plurality of nodes that are connected by the first plurality of edges; and creating a set of service links based on the generated spanning tree.

27 Claims, 19 Drawing Sheets

Data communication network 300

Service demand graph 500

Spanning tree 550

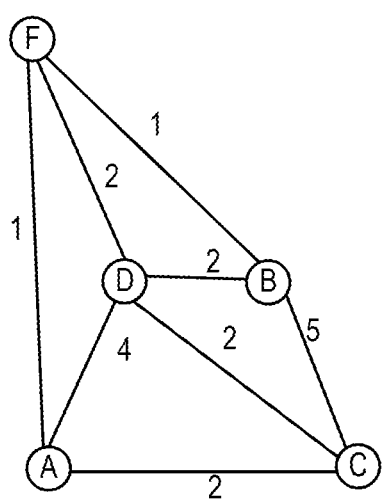
Subgroup 710A
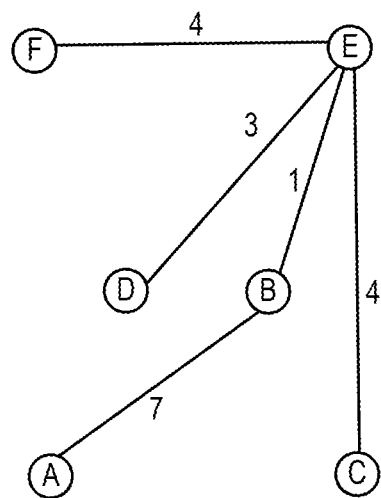
Subgroup 710B
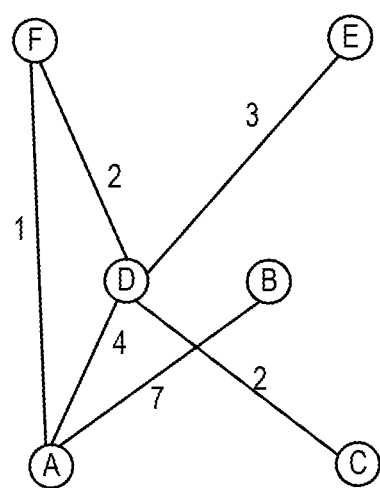
Subgroup 720A
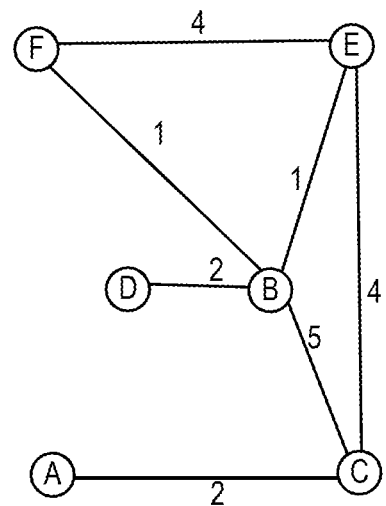
Subgroup 720B
FIG. 7

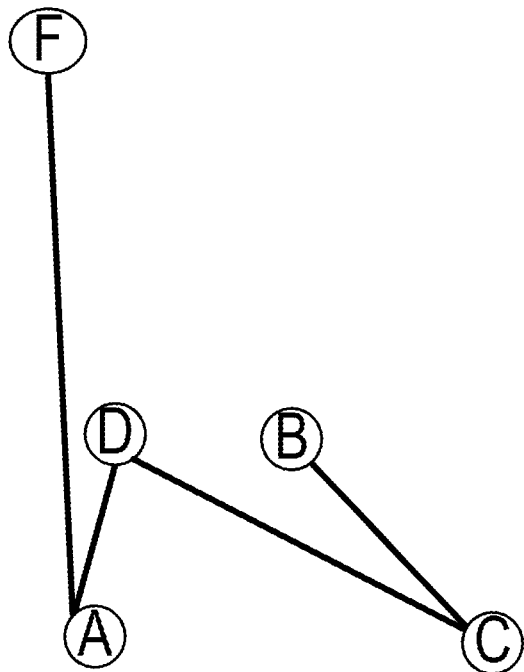 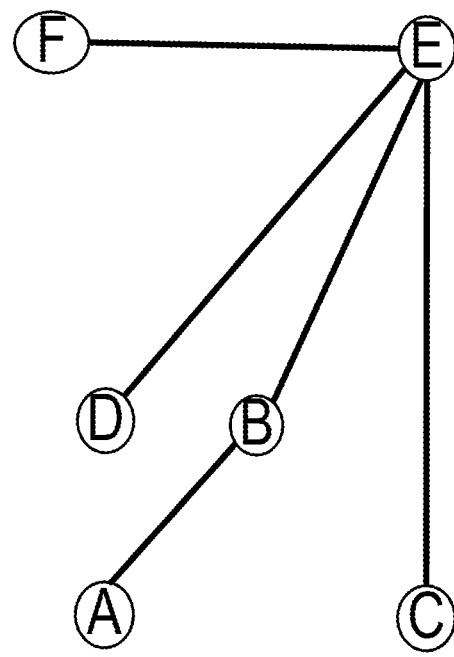
Spanning tree 810A      Spanning tree 810B
FIG. 8

Data Communication Network
1300a

Data Communication Network
1300b

Data Communication Network
1700

SATISFYING A SET OF SERVICES OVER GIVEN NETWORK RESOURCES

This application is a continuation of PCT International Application No. PCT/IB2020/057587, filed Aug. 12, 2020. The foregoing application is incorporated herein by reference in its entirety.

TECHNICAL FIELD

The present disclosure relates to the field of data communication networks and, more particularly, to systems and methods for satisfying service demands in a data communication network.

BACKGROUND

A data communication network infrastructure, such as the Internet, can be composed of a large number of network nodes that are connected among one another. Network nodes refer to network components (e.g., clients, servers, microservices, virtual machines, serverless code instances, IoT devices, etc.) that communicate with one another according to predetermined protocols by means of wired or wireless communication links. The data communication network provides services to users according to requirements of the services, such as quality of service (QoS) commitments. Different types of services with different QoS requirements may be provided by the data communication network via different service links formed by the network nodes deployed in the network.

In a data communication network, resources for services are allocated and optimized according to a current state of the network. It is often needed to satisfy service demands, when new service demands arrive, new communication network establishes, and/or other similar situations. In such circumstances, it is often desirable to satisfy the service demand with a minimal number of service links. Further, when a network link failure occurs, there is a need to provide restoration schemes to services that are impacted by the network link failure. For a large data communication network involving a large number of network nodes, the computation complexity to determine the restoration schemes can be high, and a computationally efficient method to provide restoration schemes in case of a network link failure is desired. It is also desired that a minimal number of service links is used to satisfy the service demands in the data communication network so as to reduce the cost of operating the network.

SUMMARY

In one disclosed embodiment, a method for determining service links in a data communication network is disclosed. The method comprises identifying a first plurality of edges, each of which connects two of a plurality of nodes in the data communication network, wherein each of the first plurality of edges is associated with one of a plurality of unprotected service demands; generating a spanning tree comprising a second plurality of edges selected from the first plurality of edges, wherein the spanning tree connects all of the plurality of nodes that are connected by the first plurality of edges; and creating a set of service links based on the generated spanning tree. In another disclosed embodiment, a method for determining service links in a data communication network is disclosed. The method comprises identifying a plurality of edges, each of which connects two of a plurality of nodes in the data communication network, wherein each of the plurality of edges is associated with one of a plurality of unprotected service demands; identifying a volume associated with each of the plurality of edges; partitioning the plurality of edges into a plurality of edge groups, wherein a sum of volumes of edges within each of the plurality of edge groups is equal to or less than a predetermined maximum capacity, and wherein a total number of duplicated nodes is minimal; generating a spanning tree for each of the plurality of edge groups; and creating a set of service links based on generated spanning trees.

In another disclosed embodiment, a method for satisfying demands in a data communication network utilizing a set of service links is disclosed. The method comprises identifying a plurality of service link paths, wherein each of the plurality of service link paths corresponds to one of a first plurality of demands, wherein each of the plurality of service demands is associated with a weight; wherein each of the set of service links is associated with a plurality of weights, each of the plurality of weights is associated with a service demand; and a P value is assigned to each of the plurality of service demands; selecting a second plurality of demands from the first plurality of demands, wherein a sum for each of a plurality of weights associated with the second plurality of demands is less than or equal to a predetermined value associated with each of the service links, and wherein a sum of P values associated with demands of the second plurality of demands is maximized; and satisfying the second plurality of demands using at least one of the set of service links.

In another disclosed embodiment, a method for rerouting service demands in a data communication network upon one or more failures is disclosed. The method comprises identifying one or more failed service links; identifying a second plurality of service demands among a first plurality of service demands, each of the second plurality of service demands associated with the one or more failed service links; identifying a third plurality of service demands among the second plurality of service demands, wherein for each of the third plurality of service demands, a pre-planned route that does not use the failed service links is unavailable; determining whether one or more of the third plurality of service demands can be satisfied using available service links; identifying one or more candidate routes for each of the third plurality of service demands that can be satisfied, where a candidate route comprises non-failed service links, and a P value is assigned to each of the third plurality of service demands; selecting a set of service demands from the third plurality of service demands, wherein a sum of P values associated with the set of service demands is maximized, wherein the selected set of service demands is associated with one or more of the available service links, each service link of the one or more of the available service links is associated with one or more service demands of the selected set of service demands, and for each service link of the one or more of the available service links, a total volume of the associated one or more service demands does not exceed a free space of the corresponding service link; and rerouting the selected set of service demands based on the identified candidate routes.

In another disclosed embodiment, a system for determining service links in a data communication network is disclosed. The system comprises at least one processor and at least one memory containing instructions that, when executed by the at least one processor, cause the system to perform operations comprising: identifying a first plurality of edges, each of which connects two of a plurality of nodes in the data communication network, wherein each of the first plurality of edges is associated with one of a plurality of unprotected service demands; generating a spanning tree comprising a second plurality of edges selected from the first plurality of edges, wherein the spanning tree connects all of the plurality of nodes that are connected by the first plurality of edges; and creating a set of service links based on the generated spanning tree.

In another disclosed embodiment, a system for determining service links in a data communication network is disclosed. The system comprises at least one processor and at least one memory containing instructions that, when executed by the at least one processor, cause the system to perform operations comprising: identifying a plurality of edges, each of which connects two of a plurality of nodes in the data communication network, wherein each of the plurality of edges is associated with one of a plurality of unprotected service demands; identifying a volume associated with each of the plurality of edges; partitioning the plurality of edges into a plurality of edge groups, wherein a sum of volumes of edges within each of the plurality of edge groups is equal to or less than a predetermined maximum capacity, and wherein a total number of duplicated nodes is minimal; generating a spanning tree for each of the plurality of edge groups; and creating a set of service links based on generated spanning trees.

In another disclosed embodiment, a system for satisfying demands in a data communication network utilizing a set of service links is disclosed. The system comprises at least one processor and at least one memory containing instructions that, when executed by the at least one processor, cause the system to perform operations comprising: identifying a plurality of service link paths, wherein each of the plurality of service link paths corresponds to one of a first plurality of demands, wherein each of plurality of service demands is associated with a weight; wherein each of the set of service links is associated with a plurality of weights, each of the plurality of weights is associated with a service demand; and a P value is assigned to each of the plurality of service demands; selecting a second plurality of demands from the first plurality of demands, wherein a sum for each of a plurality of weights associated with the second plurality of demands is less than or equal to a predetermined value associated with each of the service links, and wherein a sum of P values associated with demands of the second plurality of demands is maximized; and satisfying the second plurality of demands using at least one of the set of service links.

In another disclosed embodiment, a system for rerouting service demands in a data communication network upon one or more failures is disclosed. The system comprises at least one processor and at least one memory containing instructions that, when executed by the at least one processor, cause the system to perform operations comprising: identifying one or more failed service links; identifying a second plurality of service demands among a first plurality of service demands, each of the second plurality of service demands associated with the one or more failed service links; identifying a third plurality of service demands among the second plurality of service demands, wherein for each of the third plurality of service demands, a pre-planned route that does not use the failed service links is unavailable; determining whether one or more of the third plurality of service demands can be satisfied using available service links; identifying one or more candidate routes for each of the third plurality of service demands that can be satisfied, where a candidate route comprises non-failed service links, and a P value is assigned to each of the third plurality of service demands; selecting a set of service demands from the third plurality of service demands, wherein a sum of P values associated with the set of service demands is maximized, wherein the selected set of service demands is associated with one or more of the available service links, each service link of the one or more of the available service links is associated with one or more service demands of the selected set of service demands, and for each service link of the one or more of the available service links, a total volume of the associated one or more service demands does not exceed a free space of the corresponding service link; and rerouting the selected set of service demands based on the identified candidate routes.

In another disclosed embodiment, a non-transitory computer readable medium is disclosed. The non-transitory computer readable medium stores a set of instructions that is executable by a processor to cause the processor to perform operations for determining service links in a data communication network. The operations comprise identifying a first plurality of edges, each of which connects two of a plurality of nodes in the data communication network, wherein each of the first plurality of edges is associated with one of a plurality of unprotected service demands; generating a spanning tree comprising a second plurality of edges selected from the first plurality of edges, wherein the spanning tree connects all of the plurality of nodes that are connected by the first plurality of edges; and creating a set of service links based on the generated spanning tree.

In another disclosed embodiment, a non-transitory computer readable medium is disclosed. The non-transitory computer readable medium stores a set of instructions that is executable by a processor to cause the processor to perform operations for determining service links in a data communication network. The operations comprise identifying a plurality of edges, each of which connects two of a plurality of nodes in the data communication network, wherein each of the plurality of edges is associated with one of a plurality of unprotected service demands; identifying a volume associated with each of the plurality of edges; partitioning the plurality of edges into a plurality of edge groups, wherein a sum of volumes of edges within each of the plurality of edge groups is equal to or less than a predetermined maximum capacity, and wherein a total number of duplicated nodes is minimal; generating a spanning tree for each of the plurality of edge groups; and creating a set of service links based on generated spanning trees.

In another disclosed embodiment, a non-transitory computer readable medium is disclosed. The non-transitory computer readable medium stores a set of instructions that is executable by a processor to cause the processor to perform operations for satisfying demands in a data communication network utilizing a set of service links. The operations comprise identifying a plurality of service link paths, wherein each of the plurality of service link paths corresponds to one of a first plurality of demands, wherein each of plurality of service demands is associated with a weight; wherein each of the set of service links is associated with a plurality of weights, each of the plurality of weights is associated with a service demand; and a P value is assigned to each of the plurality of service demands; selecting a second plurality of demands from the first plurality of demands, wherein a sum for each of a plurality of weights associated with the second plurality of demands is less than or equal to a predetermined value associated with each of the service links, and wherein a sum of P values associated with demands of the second plurality of demands is maximized; and satisfying the second plurality of demands using at least one of the set of service links.

In another disclosed embodiment, a non-transitory computer readable medium is disclosed. The non-transitory computer readable medium stores a set of instructions that is executable by a processor to cause the processor to perform operations for rerouting service demands in a data communication network upon one or more failures. The operations comprise identifying one or more failed service links; identifying a second plurality of service demands among a first plurality of service demands, each of the second plurality of service demands associated with the one or more failed service links; identifying a third plurality of service demands among the second plurality of service demands, wherein for each of the third plurality of service demands, a pre-planned route that does not use the failed service links is unavailable; determining whether one or more of the third plurality of service demands can be satisfied using available service links; identifying one or more candidate routes for each of the third plurality of service demands that can be satisfied, where a candidate route comprises non-failed service links, and a P value is assigned to each of the third plurality of service demands; selecting a set of service demands from the third plurality of service demands, wherein a sum of P values associated with the set of service demands is maximized, wherein the selected set of service demands is associated with one or more of the available service links, each service link of the one or more of the available service links is associated with one or more service demands of the selected set of service demands, and for each service link of the one or more of the available service links, a total volume of the associated one or more service demands does not exceed a free space of the corresponding service link; and rerouting the selected set of service demands based on the identified candidate routes.

The foregoing general description and the following detailed description are exemplary and explanatory only, and are not restrictive of the claims.

BRIEF DESCRIPTION OF THE DRAWINGS

FIG. 7 illustrates two example sets of edge subgroups, consistent with embodiments of the present disclosure.

FIG. 8 illustrates an example set of spanning trees, in accordance with embodiments of the present disclosure.

DETAILED DESCRIPTION

Figure 1:
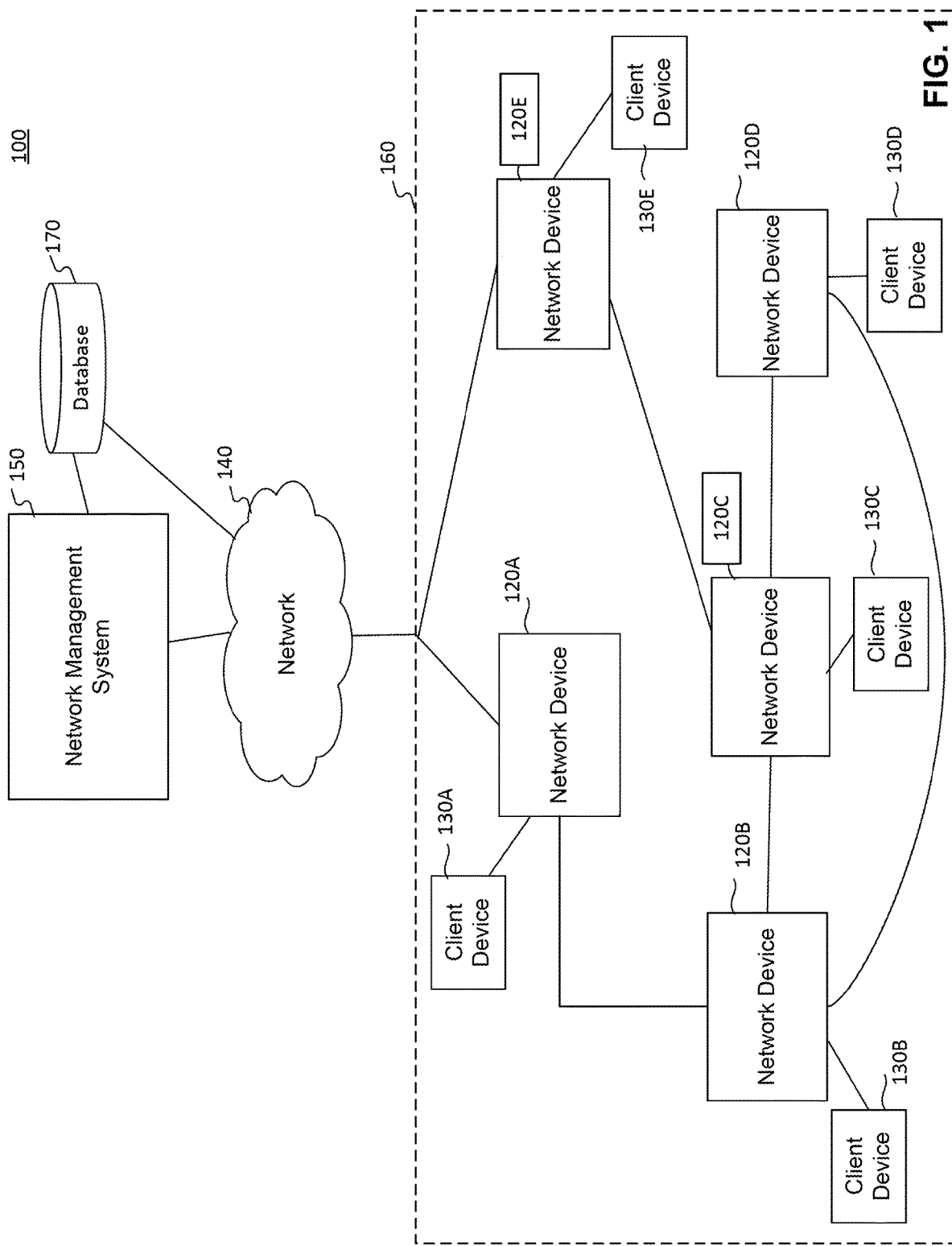
FIG. 1 shows an example data communication network in which various implementations as described herein may be practiced.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 shows an example data communication network 100 in which various implementations as described herein may be practiced. Data communication network 100 includes, for example, a network 140, network management system 150, database 170, network devices 120A-120E, and client devices 130A-130E. The network devices 120A-120E and client devices 130A-130E form a service network 160, in which the network devices 120A-120E (collectively 120) provide data services to client devices 130A-130E (collectively 130). The network devices may be hardware-based or software-based and can be electrical or optical devices such as ROADMs (reconfigurable optical add-drop multiplexers), optical cross-connect switches, routers, splitters, or the like that facilitate delivery of data services to client devices 130. The components and arrangements shown in FIG. 1 are not intended to limit the disclosed embodiments, as the system components used to implement the disclosed processes and features can vary. For example, each network device 120 may be associated with no, one, or many client devices 130. In various embodiments, service network 160 may be based on one or more of on-premises network environments, virtualized (cloud) network environments, or combinations of on-premises and cloud networks. Consistent with embodiments described herein, various types of data may be communicated over service network 160, such as Internet (e.g., IP protocol) data, telephony or telecommunications data, satellite data, IoT-based data, cellular data, proprietary network data, and more.

Network management system 150 is configured to manage service deliveries for the service network 160. For example, the network management system 150 may determine service link paths, allocate resources for services to be delivered, and establish service links to satisfy the services in the data communication network 100. The network management system 150 may also reallocate resources for the existing services when new service demands arrive at the data communication network 100. The network management system 150 may reroute the data communication network 100 for the existing services when a link failure occurs. In some embodiments, when a link failure occurs, the network management system 150 may identify restoration schemes for the disrupted service. For example, the network management system 150 may identify alternate service links that do not involve the failed communication link. In some embodiments, the network management system 150 may select to satisfy a set of service demands when network resource is insufficient to satisfy all service demands. In some embodiments, the network management system 150 may identify service links that are sufficient to satisfy the service demands in the data communication network 100 and in the meantime reduce the operation cost (e.g., in terms of equipment usage, bandwidth, processing activity, monetary cost, etc.) in the network. Network management system 150 can be a computer-based system including computer system components, desktop computers, workstations, tablets, handheld computing devices, memory devices, and/or internal network(s) connecting the components.

Network 140 facilitates communication between the network management system 150 and the service network 160. Network management system 150 may send data to network devices 120 via network 140 to allocate resources for services in the data communication network 100. Network management system 150 may also receive data from network devices 120 via network 140 indicating the status of service links in the data communication network 100. Network 140 may be an electronic network. Network devices 120 may be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly-accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long Term Evolution (LTE) network or a Personal Communication Service (PCS) network, that allow mobile devices (e.g., client devices 130) to send and receive data via applicable communication protocols, including those described above.

In the illustrated example, network devices 120A and 120E are directly connected to network 140, and network devices 120B-120D connect to the network 140 via their connection to network device 120A and/or 120E. One of ordinary skill in the art would appreciate that network devices 120B-120D may also directly connect to the network 140, or may indirectly connect to the network 140 through numerous other devices. Network devices 120 may be connected to one another via copper wire, coaxial cable, optical fiber, microwave links, or other satellite or radio communication components. Accordingly, network devices 120 may each have a corresponding communications interface (e.g., wireless transceiver, wired transceiver, adapter, etc.) to allow for such communications.

As shown in FIG. 1, network devices 120A-120E are connected to one another. In this example, network device 120A is connected to network device 120B, network device 120B is connected to network devices 120A, 120C, and 120D, network device 120C is connected to network devices 120B, 120D, and 120E, network device 120D is connected to network device 120C, and network device 120E is connected to network device 120C. In some embodiments, a network topology may be formed to present a graphical view of the service network 160, where each of the network devices 120 corresponds to a network node or vertex in the network topology. In this disclosure, the terms "node" and "vertex" are exchangeable. The network topology also shows the interconnection relationships among the network devices. In some embodiments, the network management system 150 may obtain the connectivity status between the network devices and generate a network topology. In other embodiments, the network management system 150 may acquire the network topology from a server or a database associated with a service provider providing the service network. One of ordinary skill in the art would appreciate that the service network 160 illustrated in FIG. 1 is merely an example, and the network topology of service network 160 can be different from the example without departing from the scope of the present disclosure.

Network management system 150 may reside in a server or may be configured as a distributed system including network devices or as a distributed computer system including multiple servers, server farms, clouds, computers, or virtualized computing resources that interoperate to perform one or more of the processes and functionalities associated with the disclosed embodiments.

Database 170 includes one or more physical or virtual storages coupled with the network management system 150. Database 170 may be configured to store information associated with the service network 160, such as the network topology, the capability of the network devices, the services and corresponding configurations provided by the service network, and so on. Database 170 may also be adapted to store processed information associated with the network topology and services in the service network 160, so as to facilitate efficient route configurations and resource allocations to satisfy the service demands in the service network 160. The data stored in the database 170 may be transmitted to the network management system 150 and/or the network devices 120. In some embodiments, the database 170 is stored in a cloud-based server (not shown) that is accessible by the network management system 150 and/or the network devices 120 through the network 140. While the database 170 is illustrated as an external device connected to the network management system 150, the database 170 may also reside within the network management system 150 as an internal component of the network management system 150.

As shown in FIG. 1, network devices 120A-120E are connected with client devices 130A-130E respectively to deliver services. As an example, client devices 130A-130E include a display such as a television, tablet, computer monitor, video conferencing console, IoT device, or laptop computer screen. Client devices 130A-130E may also include video/audio input devices such as a video camera, web camera, or the like. As another example, client devices 130A-130E include mobile devices such as a tablet or a smartphone having display and video/audio capture capabilities. While FIG. 1 shows one client device 130 connected to each network device 120, one of ordinary skill in the art would appreciate that more than one client device may be connected to a network device and that in some instances a network device may not be connected to any client device.

In some embodiments, the data communication network 100 may include an optical network, where the network devices 120 are interconnected by optical fiber links. The optical fiber links may be capable of conveying a plurality of optical channels using a plurality of specified different optical wavelengths. The optical network may be based on a wavelength division multiplexing (WDM) physical layer. A WDM optical signal comprises a plurality of transmission channels, each channel carrying an information signal modulated over a carrier wavelength. For example, the network devices 120 may be provided with the ability to switch a channel from an input fiber to an output fiber, and to add/drop traffic. The network devices 120 may include a wavelength switch or an optical add/drop multiplexer that performs optical add, drop, and pass through. The network devices 120 may include optical or optical/electrical elements being adapted to perform to various functions such as compensating, amplifying, switching, restoring, performing wavelength conversion of incoming optical signals, etc. The optical fiber links may include dispersion compensation fibers (DCF), optical filters, amplifiers and other relevant optical components that are used for operation of optical networks. The network management system 150 or database 170 may store topologic data including information about optical channels and their associated wavelengths. In some embodiments, the data communication network 100 may include a network controller (not shown) configured to improve network utilization by providing an optimal routing and wavelength assignment plan for a given set of service demands. In the context of an optical network, a service demand is a request for a wavelength between two nodes in the network. A circuit is provisioned to satisfy a service demand and is characterized by a route and assigned wavelength number. Service demands may be unprotected, in which case a single route is requested and provided, or protected, in which case two or more routes between the service endpoints are requested and provided.

Figure 2:
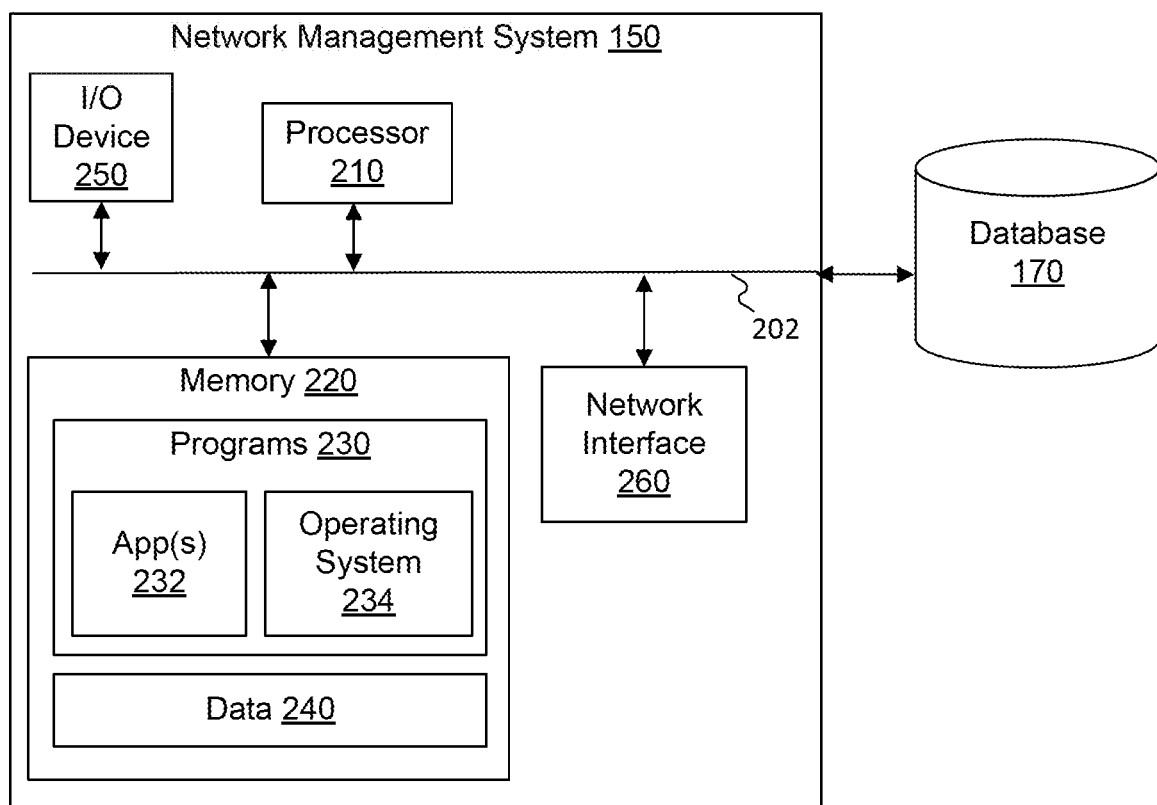
FIG. 2 shows a diagram of an example network management system, consistent with the disclosed embodiments.

FIG. 2 shows a diagram of an example network management system 150, consistent with the disclosed embodiments. The network management system 150 may be implemented as a specially made machine that is specially programed to perform functions relating to managing a data communication network. The special programming at the network management system 150 enables network management system to determine service routes and allocate resources for services to be delivered in the data communication network 100.

The network management system 150 includes a bus 202 (or other communication mechanism) which interconnects subsystems and components for transferring information within the network management system 150. As shown, the network management system 150 includes one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the network management system 150).

The processor 210 may be one or more processing devices configured to perform functions of the disclosed methods, such as a microprocessor manufactured by Intel™ or manufactured by AMD™. The processor 210 may comprise a single core or multiple core processors executing parallel processes simultaneously. For example, the processor 210 may be a single core processor configured with virtual processing technologies. In certain embodiments, the processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the network management system 150 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The network management system 150 may include one or more storage devices configured to store information used by processor 210 (or other components) to perform certain functions related to the disclosed embodiments. For example, the network management system 150 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to the network management system 150) or external storage communicatively coupled with the network management system 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint databases, Oracle™ databases, Sybase™ databases, or other relational databases.

In some embodiments, the network management system 150 may be communicatively connected to one or more remote memory devices (e.g., remote databases (not shown)) through network 140 or a different network. The remote memory devices can be configured to store information that the network management system 150 can access and/or manage. By way of example, the remote memory devices could be document management systems, Microsoft™ SQL database, SharePoint databases, Oracle™ databases, Sybase™ databases, or other relational databases. Systems and methods consistent with disclosed embodiments, however, are not limited to separate databases or even to the use of a database.

The programs 230 include one or more software modules configured to cause processor 210 to perform one or more functions of the disclosed embodiments. Moreover, the processor 210 may execute one or more programs located remotely from one or more components of the data communication network 100. For example, the network management system 150 may access one or more remote programs that, when executed, perform functions related to disclosed embodiments.

In the presently described embodiment, server app(s) 232 causes the processor 210 to perform one or more functions of the disclosed methods. For example, the server app(s) 232 cause the processor 210 to determine service routes and allocate resources for services to be delivered in the data communication network 100.

In some embodiments, the program(s) 230 may include the operating system 234 performing operating system functions when executed by one or more processors such as the processor 210. By way of example, the operating system 234 may include Microsoft Windows™, Unix™, Linux™, Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. The network management system 150 may also include software that, when executed by a processor, provides communications with network 140 through the network interface 260 and/or a direct connection to one or more network devices 120A-120E.

In some embodiments, the data 240 may include, for example, network configurations, requirements of service demands, service demand graph, spanning trees, capacity of the service links in the network and each service link path, and so on. For example, the data 240 may include network topology of the service network 160, capacity of the network devices 120, and capacity of the communication link between the network devices 120. The data 240 may also include requirements of service demands and resource allocation for each service in the service network 160.

The network management system 150 may also include one or more I/O devices 250 having one or more interfaces for receiving signals or input from devices and providing signals or output to one or more devices that allow data to be received and/or transmitted by the network management system 150. For example, the network management system 150 may include interface components for interfacing with one or more input devices, such as one or more keyboards, mouse devices, and the like, that enable the network management system 150 to receive input from an operator or administrator (not shown).

Figure 3:
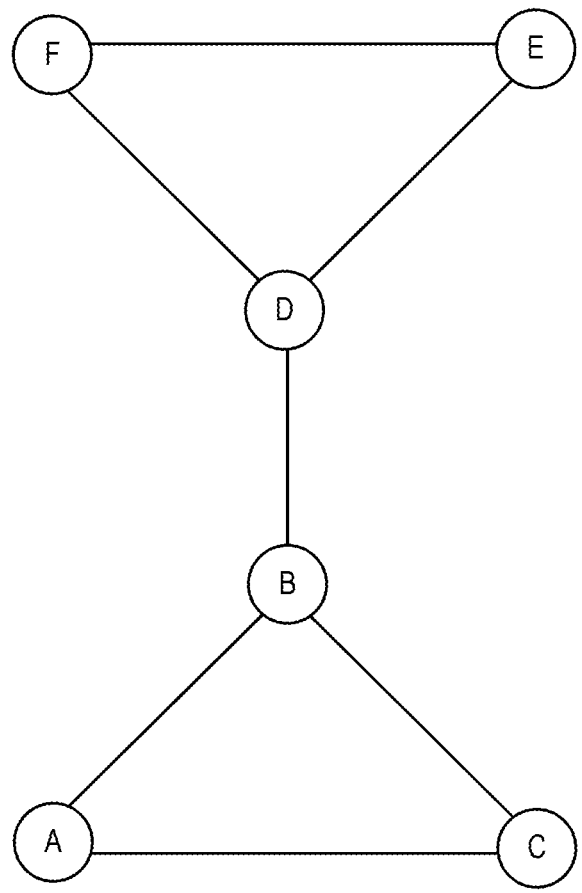
FIG. 3 is a diagram illustrating an example data communication network, in accordance with embodiments of the present disclosure.

FIG. 3 is a diagram illustrating an example data communication network 300, in accordance with embodiments of the present disclosure. As shown in FIG. 3, the network graph 300 contains network nodes A, B, C, D, E, and F. As discussed earlier, a network node refers to a network component, such as network devices 120, that communicates with one another according to predetermined protocols by means of wired or wireless communication links. A pair of network nodes may be directly connected by an edge, which indicates that a physical link exists between the pair of nodes. For example, the edge connecting network nodes F and D means that network nodes F and D are directly connected by at least one type of physical link, such as optical fiber links, Ethernet cable, wireless connection, etc. This figure is for illustration only and a person of skill in the art would appreciate that the disclosed embodiments are applicable as well to other patterns of network configurations.

Figure 4:
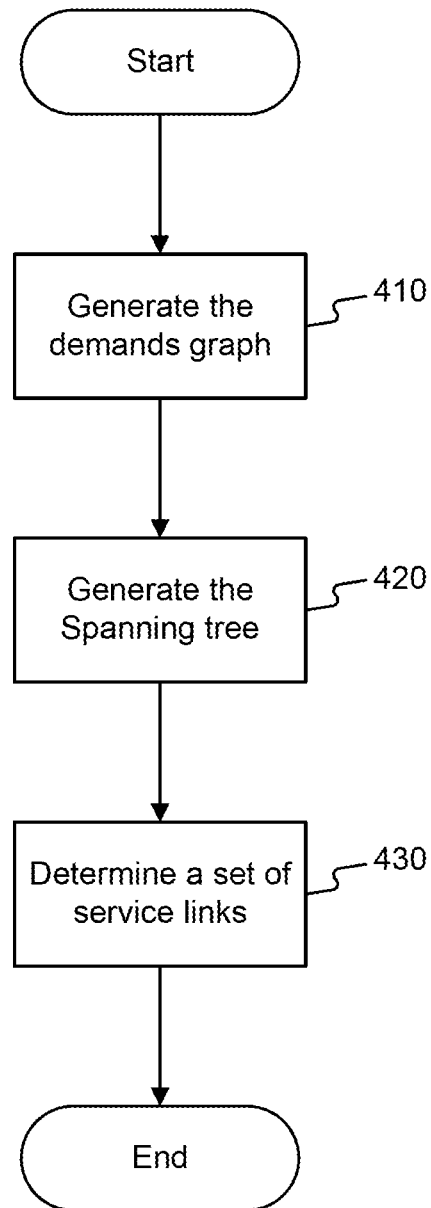
FIG. 4 is a flowchart of an example process for satisfying unprotected service demands, in accordance with embodiments of the present disclosure.

FIG. 4 is a flowchart of an example process 400 for satisfying unprotected service demands, in accordance with embodiments of the present disclosure. The steps associated with this example process can be performed by, for example, a processor of the network management system 150 of FIG. 1. The example process 400 may be implemented where the service demands in the network are unprotected and service link capacities are not limiting (e.g. the total volume of the service demands is below the link capacity limit). A protected service demand requires two or more pre-configured and disjoint paths to withstand one or more network failures, such that in the case of link and/or node failure the service demand can be satisfied using the pre-assigned, undamaged network resources. An unprotected service demand requires a single pre-assigned route.

In step 410, the network management system 150 generates a service demand graph according to service demands in the data communication network. The service demand graph depicts the topological relationship among network nodes and service demands in the communication network. It includes a plurality of vertices each of which corresponds to a network node and includes a plurality of edges each of which corresponding to a service demand between a pair of network nodes. Unlike the network graph 300 discussed above, a service demand graph typically does not depict physical connections and spatial relations of the network nodes, focusing on the service demands. For example, two network nodes physically directly connected are not necessarily directly connected in the service demand graph and vice versa. Similarly, two network nodes physically adjacent to each other do not necessarily appear as two adjacent vertices in the service demand graph and vice versa.

To generate the demand graph, the network management system 150 may identify a set of network nodes in the communication network and generate a set of vertices, each of which is associated with a network node. The network management system 150 may also identify service demands in the network. If a service demand exists between a pair of network nodes, the network management system 150 may generate an edge connecting the corresponding pair of vertices. The service demand graph data may be stored in a database connected to the network management system 150, such as the data base 170, or stored locally in the network management system 150. In some embodiments, the network nodes and service demand information may be generated separately by a network controller based on the requirements of services in the network and fed into the network management system 150. In some embodiments, the demand graph may be continuously or periodically updated based on the current network status or the service demands. While the term "graph" is frequently used in this disclosure, drawing or displaying the demand graph is not required.

Figure 5A:
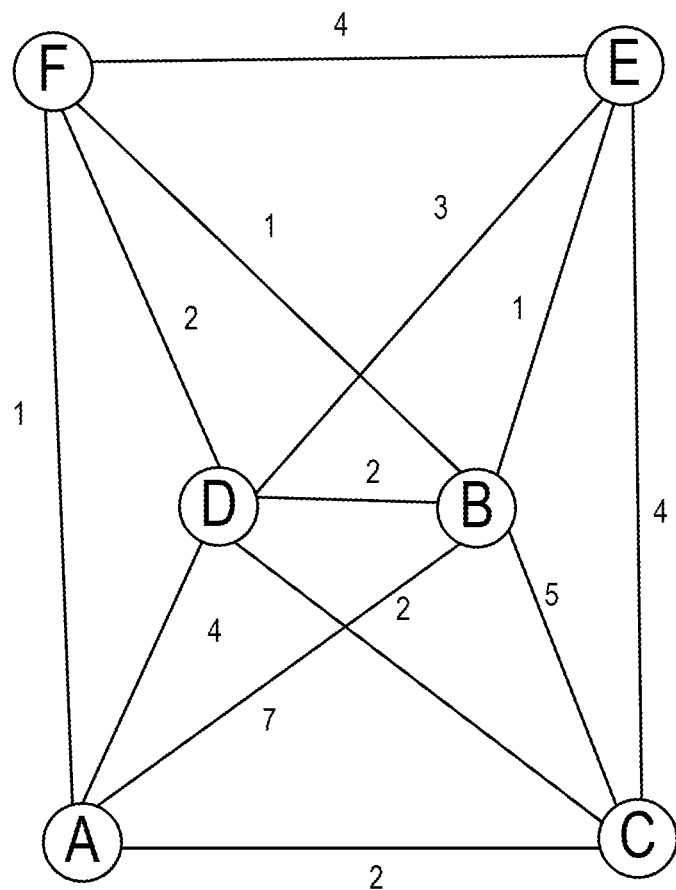
FIG. 5A is a diagram illustrating an example service demand graph in a data communication network, consistent with embodiments of the present disclosure.

FIG. 5A is a diagram illustrating an example service demand graph 500 in a data communication network, consistent with embodiments of the present disclosure. This example service demand graph 500 includes all the end points of service demands in the example data communication network. For example, network nodes A and C are connected by an edge between A and C, which corresponds to the service demand between network nodes A and C. In some embodiments, service demand graph 500 may include the volume of each service demand. For example, as shown in FIG. 5A, the number 2 below the edge connecting network nodes A and C indicates that the volume of the service demand is 2 GB. Thus, in this service demand graph 500, vertices corresponding to six network nodes {A, B, C, D, E, F} are connected by edges corresponding to service demands <A, B>, <A, C>, <A, D>, <A, F>, <B, C>, <B, D>, <B, E>, <B, F>, <C, D>, <C, E>, <D, E>, <D, F>, <E, F>. In this disclosure, each service demand can be identified by a tuple <s, t>, with s and t being end nodes of the service demand. The service demand graph 500 is for illustration purpose only and a person of skill in the art would appreciate that the disclosed embodiments are applicable to other patterns of network configurations and service demands. In this disclosure, the terms "node" and "vertex" may be used interchangeably.

Referring to FIG. 4, the network management system 150, in step 420, may generate a spanning tree comprising a plurality of edges selected from the edges in the service demand graph. A spanning tree is a subgraph of the service demand graph that is a tree including all of the vertices of the demand graph, with no cycles formed by the vertices and edges. A spanning tree may contain a number of edges equal to the number of vertices minus one. In some embodiments, the network management system 150 may generate a spanning tree by removing certain edges of the service demand graph 500 generated in step 410. A person of skill in the art would understand that many algorithms are available for creating a spanning tree, such as Prim's or Kruskal's algorithms. While there may be more than one available spanning trees for a given service demand graph 500, step 420 does not require generating more than one spanning tree. The spanning tree data may be stored in a database connected to the network management system 150, such as the data base 170, or stored locally in the network management system 150.

Figure 5B:
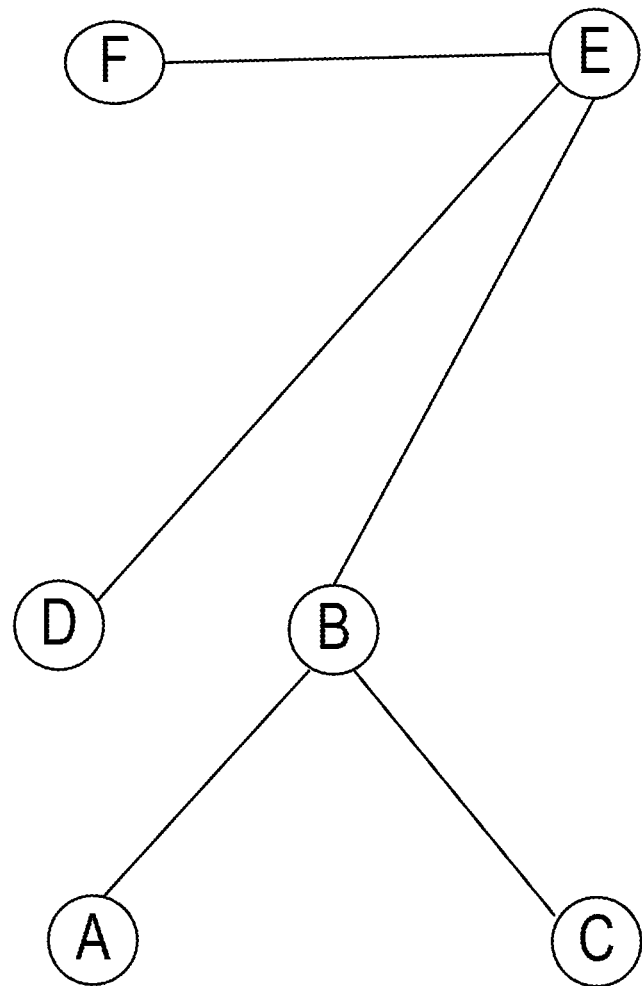
FIG. 5B is a diagram illustrating an example spanning tree.

FIG. 5B is a diagram illustrating an example spanning tree 550 corresponding to the service demand graph 500 described in the step 410. As shown in FIG. 5B, all the network nodes are connected directly or indirectly, and removing any of the edges in the spanning tree 550 would cause at least two nodes disconnected from each other. In this example, there is no edge directly connecting the network nodes A and F, while a service demand does exist between the network nodes A and F. There may be other spanning trees for the service demand graph 500 that are different from the example spanning tree 550.

Referring to FIG. 4, the network management system 150, in step 430, may determine a set of service links based on the generated spanning tree. Utilizing a spanning tree in determining service links may reduce the overall service links needed in the data communication network, where a spanning tree depicts topological arrangement of edges with a minimal number of edges for connecting all the vertices in a graph. A service link is a communication channel that connects two devices, or network nodes in the current disclosure, for the purpose of data transmission. For example, a service link may be implemented as an OCH (optical channel) in optical networks. A service link may be established by a dedicated physical link and/or a virtual circuit sharing physical links with other service links or combining one or more physical links. In some embodiments, the network management system 150 may allocate network resource to each of the generated service links.

The network management system 150 may establish a service link associated with each edge of the identified spanning tree 550. The established service link connects the pair of network nodes connected by the associated spanning tree edge. For example, the network management system 150 may generate service links connecting vertices (A, B), (B, C), (B, E), (D, E), and (E, F) in accordance with the example spanning tree 500. Utilizing the service links, the service demands in the data communication network can be satisfied. A service demand may be satisfied by one service link that directly connects the pair of network nodes associated with the service demand, while multiple service links may be needed to satisfy certain service demands. For example, referring to the spanning tree 550 shown in FIG. 5B, service demand between service nodes A and B can be satisfied by utilizing the service link (A, B). In contrast, satisfying the service demand between A and F may require utilizing three service links: (A, B), (B, E), and (E, F). A service link or a set of service links that satisfies a service demand is referred as service link path in this disclosure.

A service link may involve multiple physical links in some embodiments. For example, service link (B, E) in spanning tree 550 may involve physical links between network nodes B and D and between network nodes D and E in the data communication network 300, as shown in FIG. 3. Further, multiple service links may share the same physical links. For another example, the service links (B, E) and (D, E) in the spanning tree 550 share the same physical link between network nodes D and E in the data communication network 300, as shown in FIG. 3. While physical links may be considered in risk analysis discussed later, the process 400 focuses on service demands among network nodes in a communication network.

In a communication data network involving a set of demands where the number of vertices in the corresponding demand graph is K, K being a positive integer, applying the method 400 described above may result in a spanning tree with K−1 edges and a set of service links with size K−1. Thus, a number of K−1 service links may be sufficient to satisfy the service demands if the capacity of each service link is greater than or equal to the total volume of the service demands in the network.

Figure 6:
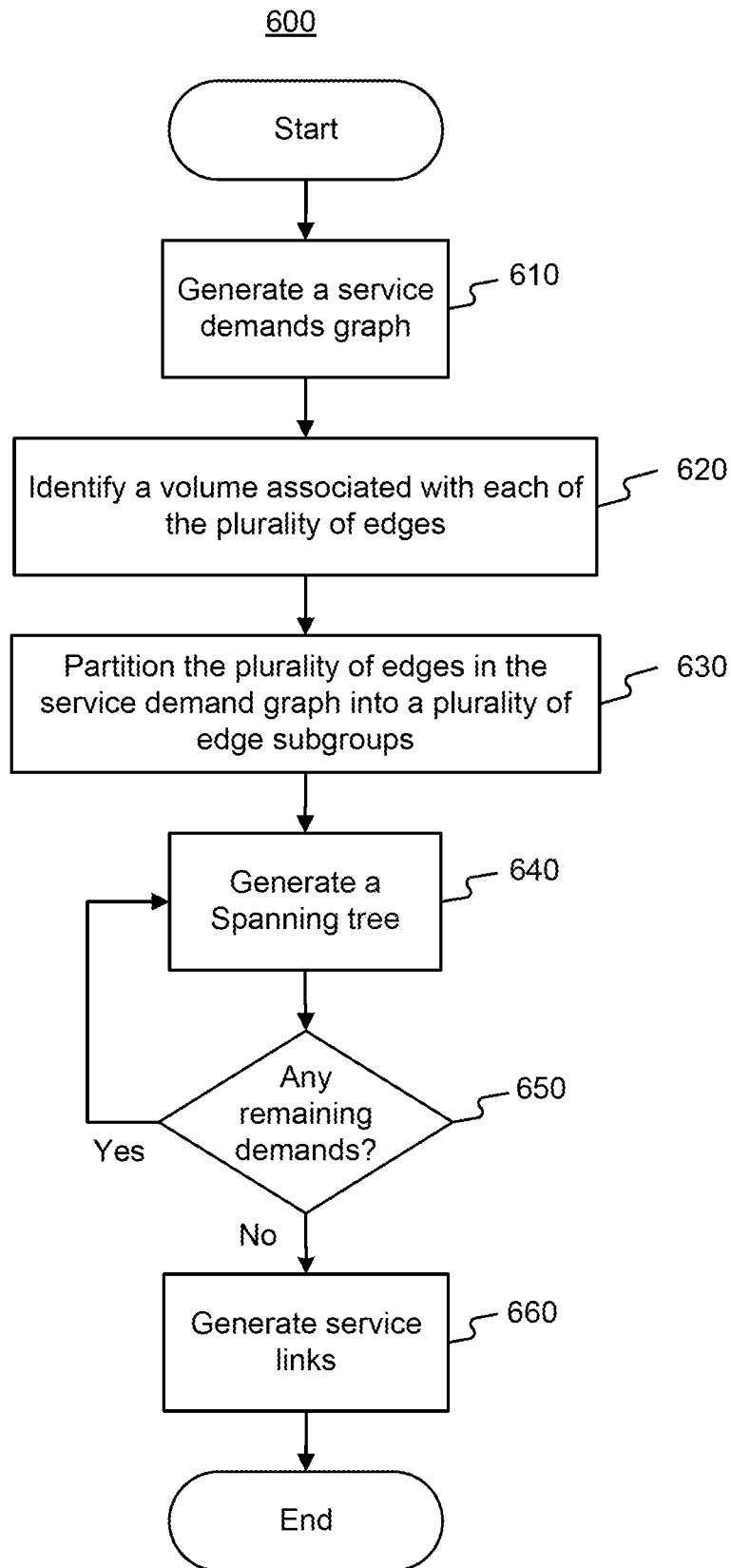
FIG. 6 is a flowchart of another example process for satisfying unprotected service demands, in accordance with embodiments of the present disclosure.

FIG. 6 is a flowchart of an example process 600, in accordance with embodiments of the present disclosure, for satisfying unprotected service demands when the data communication network is subjected to a capacity limit. As explained above, the process 400 can be implemented where service link capacities do not limit the configuration or deployment of the communication network. In some scenarios, however, the total volume of service demands may exceed the capacity of service links, in which case, a service network deployed in accordance with single spanning tree may not satisfy all the service demands in the data communication network. For example, the total volume of service demand of the example service demand graph 500 shown in FIG. 5A is 38 GB (4+1+3+2+1+1+2+4+2+5+4+7+2=38). When the maximum service link capacity is lower than 38

GB, satisfaction of all service demands may not be guaranteed using a single spanning tree. In such scenarios, the network management system 150 may use process 600 to identify service links satisfying all service demands where the total volume of service demands exceed the service link capacity. For the purpose of illustration, capacities of all service links discussed in the examples in this disclosure are assumed to be 20 GB. However, a person of ordinary skill in the art would appreciate that the disclosed invention may be implemented where service link capacities is not 20 GB and differ from one another.

In step 610, the network management system 150 may generate a service demands graph. The service demand graph may be generated using the same procedure as step 410 referring to FIG. 4 discussed above.

In step 620, the network management system 150 identifies a volume associated with each of the plurality of edges in the service demand graph 500. In some embodiments, the volume information may be generated separately by a network controller based on the requirements of services in the network and fed into the network management system 150. In some embodiments, the demand volume data may be generated or input locally at the network management system 150. The service demand volume data may be stored in a separate database connected to the network management system 150 or stored locally at the network management system 150. In some embodiments, the service demand volume data may be continuously or periodically updated based on the current network status or the service demands.

In step 630, the network management system 150 partitions the plurality of edges in the service demand graph into a plurality of edge subgroups. Each edge subgroup comprises one or more edges whose total service demand volume is equal to or lower than a maximal service link capacity of the potential service links that would serve the service demands in the edge subgroup. An example process of partitioning the edges into subgroups will be explained in detail below in referring to FIG. 9. In some embodiments, the network management system 150 may adopt other edge partition processes or algorithms. For example, the edge partition algorithm presented by Zhang et al. in "Graph edge partitioning via neighborhood heuristic," in Proceedings of the ACM SIGKDD International Conference on Knowledge Discovery and Data Mining (August 2017), can be implemented in step 630. As another example, the edge partition algorithm presented by Goldschmidt et al. in "The SONET Edge-Partition Problem," in Networks, vol. 41, no. 1, pp. 13-23 (January 2003), referred to as Goldschmidt, can be implemented in step 630 and is incorporated herein by reference. Goldschmidt presents an algorithm named K-edge partition to partition the edges of a graph into subgroups of maximal size K, where the size of a subgroup is the number of edges it contains. In Goldschmidt, all the edges are identical and carry the same relative weight in the subgroup. In the embodiments disclosed in the present application, the edges are partitioned such that the total volume of the subgroup is bounded, with each edge carrying a volume (e.g., the demand volume associated with the edge) that might be different from other edges in the edge subgroup. The disclosed embodiments can be applied to any additive metric on the edges and any corresponding bound on the edge subgroup. Thus, the disclosed embodiments provide applications different from Goldschmidt. Moreover, Goldschmidt includes two phases of the tree traversal because the contribution of any additional edges is bounded (due to the identical weight of the edges in the subgroup, which is one), while the disclosed embodiments utilize a single phase. While more than one viable option of partitioning the edges may exist for a given service demand graph 500, it would be sufficient for the network management system 150 to generate one set of edge subgroups. In some embodiment, the network management system 150 may select one set of edge subgroups when multiple sets of edge subgroups are available. For example, the network management system 150 may select a set of edge subgroups with the minimal number of total vertices.

FIG. 7 illustrates two example sets of subgroups generated from the example service demand graph 500. In this disclosure, the example service link capacities are assumed to be 20 GB unless otherwise specified. Under such condition, the example service demand graph 500 can be partitioned into a first set of subgroups (subgroup 710A and subgroup 710B) or a second set of subgroups (subgroup 720A and subgroup 720B). As shown in Table 1 and Table 2, the total volumes of each subgroup is equal to or lower than 20 GB, the example maximal service link capacity. The number of vertices in the first set of subgroups is equal to 11 as the vertices A, B, C, D, and F are duplicated. The number of vertices in the second set is equal to 12 as the vertices A, B, C, D, E, and F are duplicated. In some embodiments, the set of subgroups that involves a smaller number of vertices may be preferable.

TABLE 1 the first set of subgroups

| Subgroup | Demands in the Edge subgroup | Total volume |
| --- | --- | --- |
| Subgroup 710A | <A, C> (2 GB), <A, D> (4 GB), <A, F> (1 GB), <B, C> (5 GB), <B, D> (2 GB), <B, F> (1 GB), <C, D> (2 GB), <D, F> (2 GB). | 2 + 4 + 1 + 5 + 2 + 1 + 2 + 2 = 19 GB |
| Subgroup 710B | <A, B> (7 GB), <B, E> (1 GB), <C, E> (4 GB), <D, E>, (3 GB), <E, F>, (4 GB) | 7 + 1 + 4 + 3 + 4 = 19 GB |

TABLE 2 the second set of subgroups

| Subgroup | Demands in the Edge subgroup | Total volume |
| --- | --- | --- |
| Subgroup 720A | <A, B> (7 GB), <A, D> (4 GB), <A, F> (1 GB), <C, D> (2 GB), <D, E>, (3 GB), <D, F> (2 GB). | 7 + 4 + 1 + 2 + 3 + 2 = 19 GB |
| Subgroup 720B | <A, C> (2 GB), <B, C> (5 GB), <B, D> (2 GB), <B, E> (1 GB), <B, F> (1 GB), <C, E> (4 GB), <E, F> (4 GB) | 2 + 5 + 2 + 1 + 1 + 4 + 4 = 19 GB |

Referring back to FIG. 6, in step 640, the network management system 150 generates a spanning tree for each of the plurality of edge subgroups. A spanning tree for each edge subgroup may be generated in a similar manner as discussed above in step 420 described above in connection with FIG. 4.

FIG. 8 illustrates an example set of spanning trees generated from edge subgroups 710A and 710B. Specifically, spanning tree 810A is the corresponding spanning tree generated from the edge subgroup 710A, and spanning tree 810B is the corresponding spanning tree generated from the edge subgroup 710B. As shown in FIG. 8, all the network nodes in each subgroup are connected directly or indirectly without forming a loop. Edges (A, C), (B, D), (B, F), and (D, F) are removed from the edge subgroup 710A, resulting in the spanning tree 810A connecting all the nodes in the edge subgroup 710A. No edges are removed from the edge subgroup 710B because no loop exists in the edge subgroup 710B. Further, removing any of the edges in FIG. 8 would cause at least two nodes in the same edge subgroup disconnected from each other. In this example, while vertices A and C are not directly connected with an edge, the demand between the pair of nodes may be satisfied using service links (A, D) and (D, C). As a result, if an edge subgroup includes both end points of a service demand, the service demand can be satisfied by the service links created for the corresponding spanning tree, as the edge subgroup's total volume is less than or equal to the service link maximal capacity.

Referring to FIG. 6, in step 650, the network management system 150 determines whether all the service demands may be satisfied using the spanning trees created so far. If at least one service demand may not be satisfied using the spanning trees, the network management system 150 repeats step 640 to generate another spanning tree covering that service demand. If the network management system 150 determines that all service demands may be satisfied by the spanning trees, the network management system 150 proceeds to step 660.

In step 660, the network management system 150 generates a set of service links based on the generated spanning trees. In some embodiments, the network management system 150 may generate a service link for each edge in each spanning tree in a similar manner as discussed above in step 430 in connection with FIG. 4. The network management system 150 may repeat this step until service links for all the edges in all the spanning trees are generated. Table 3 illustrates that service demands of the example service demand graph 500 are satisfied using the process 600.

TABLE 3 satisfy demands with service links.

| Demand | Volume | Subgroup | Service Links |
|---|---|---|---|
| <A, B> | 7 GB | 710B | (A, B) |
| <A, C> | 2 GB | 710A | (A, D), (C, D) |
| <A, D> | 4 GB | 710A | (A, D) |
| <A, F> | 1 GB | 710A | (A, F) |
| <B, C> | 5 GB | 710A | (B, C) |
| <B, D> | 2 GB | 710A | (B, C) (C, D) |
| <B, E> | 1 GB | 710B | (B, E) |
| <B, F> | 1 GB | 710A | (B, C), (C, D), (A, D), (A, F) |
| <C, D> | 2 GB | 710A | (C, D) |
| <C, E> | 4 GB | 710B | (C, E) |
| <D, E> | 3 GB | 710B | (D, E) |
| <D, F> | 2 GB | 710A | (A, D), (A, F) |
| <E, F> | 4 GB | 710B | (E, F) |

Figure 9:
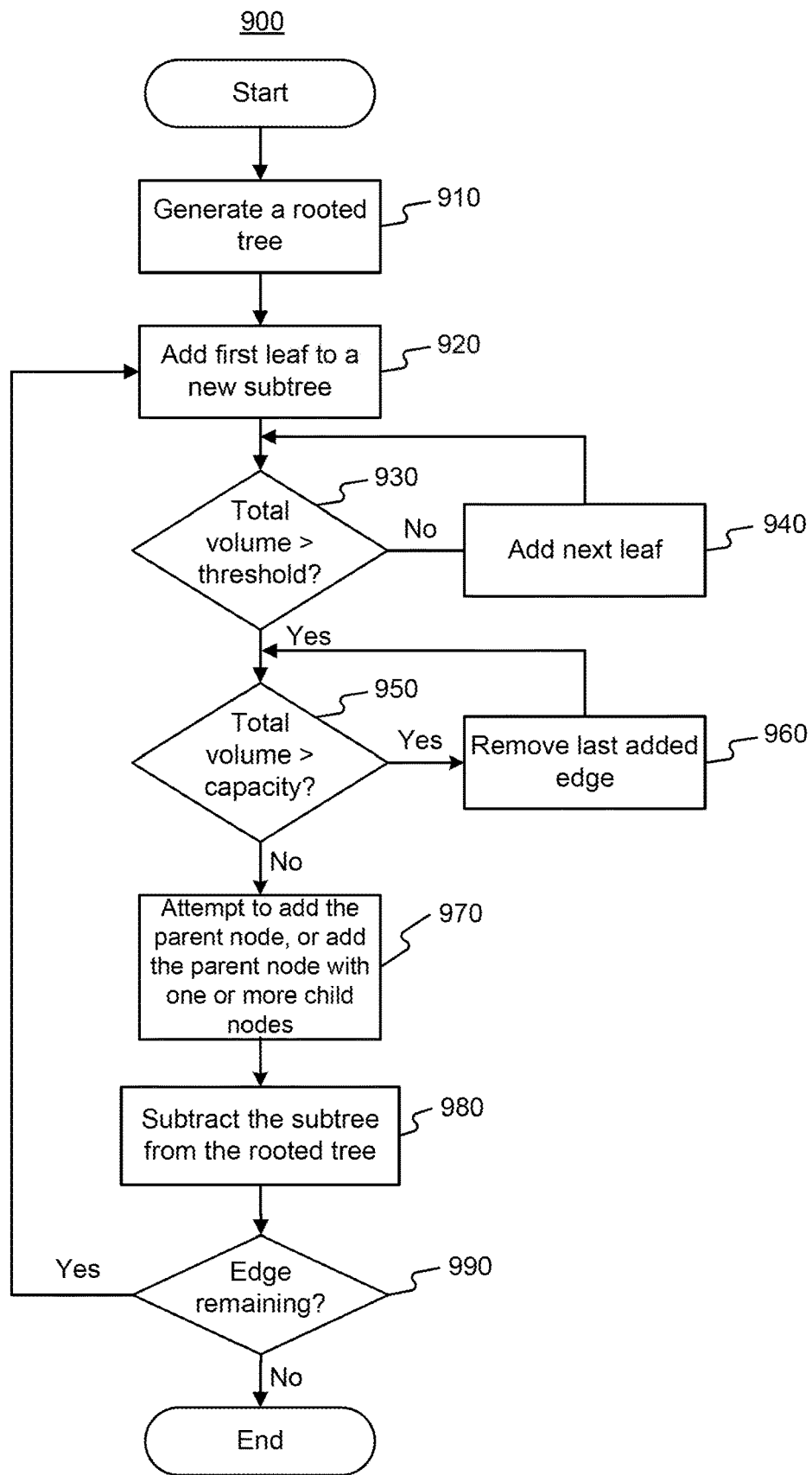
FIG. 9 is a flowchart of an example process for edge partitioning, in accordance with embodiments of the present disclosure.

FIG. 9 is a flowchart of an example process 900 for edge partitioning, in accordance with embodiments of the present disclosure. Other algorithm different from the process 900 may also be used to partition edges into subgroups.

Figure 10:
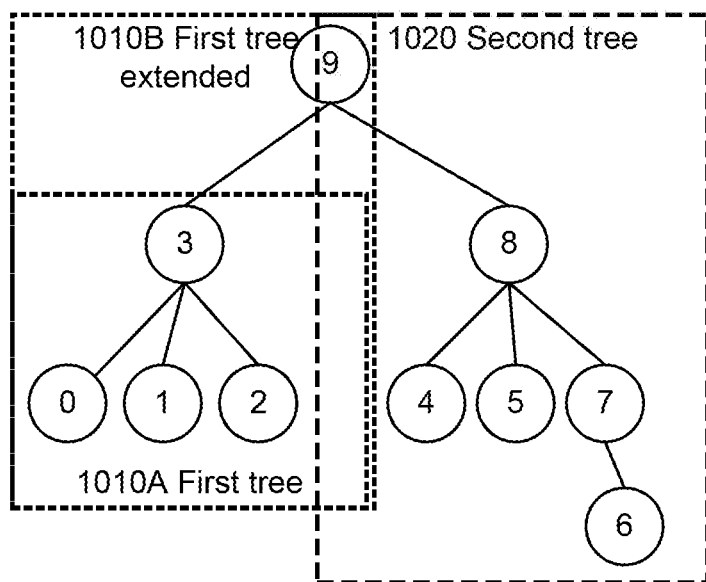
FIG. 10 is an example tree obtained based on the process described in FIG. 9 of this disclosure.

In step 910, the network management system 150 converts a service demand graph into a rooted tree. In some embodiments, the network management system 150 may open up loops in the service demand graph by duplicating vertices. Then the network management system 150 may select a vertex as the root node, generating a rooted tree. In some embodiments, the network management system 150 may arbitrarily select a vertex as the root node, while in other embodiments the network management system 150 may determine a root node based on a pre-set preference or conditions. The network management system 150 may order the vertices by post-order, starting from the leftmost leaf. A post-order traversal processes all nodes of a tree by recursively processing all subtrees, then finally processing the root. FIG. 10 illustrates an example tree generated in this step. As shown in FIG. 10, the leftmost leaf is labeled as 0; the sibling node next to the node 0 is labeled as 1 and so on. Each node may be labeled after all child nodes rooted from the node are labeled. Although the sequence used in the example tree starts from 0 with an increment at 1, any sequence to label the nodes in the tree may be adopted without departing from the scope of the present disclosure.

In steps 920-940, the network management system 150 generates a subtree, whose total volume of service demand is greater than a threshold, e.g. half of the service link capacity. In some embodiments, the network management system 150 may start a new subtree from an edge to the first leaf (e.g. node 0), adding the edge associated with the first leaf into the subtree (step 920). The network management system 150 may then calculate the total service demand volume of the subtree based on the edges in the subtree and determine whether it exceeds the threshold, e.g., half of the service link capacity (930). If the total service demand volume is less than the threshold, the network management system 150 may repeatedly add the next node and associated edges into the subtree (step 940) until the total volume of the subtree exceeds the threshold. In some embodiments, the network management system 150 may further determine whether the total volume exceeds the service link capacity (step 950). If the last added edge causes the total volume of the subtree to exceed the service link capacity, the network management system 150 may remove the last added edge from the subtree (step 960) until the total volume of the subtree is equal to or lower than the service link capacity.

In step 970, the network management system 150 may attempt to add the parent node either with only an edge connecting the parent node to the subtree, or with the edge and some (or all) child nodes of the parent node with their corresponding subtrees. Otherwise the network management system 150 may not add the parent node to the subtree and proceed to the next step.

In step 980, the network management system 150 may subtract the subtree from the rooted tree. A node may be removed from the tree only if all the edges to its children are removed. In some embodiment, the subtree may be stored in a database connected to the network management system 150, such as the data base 170, or stored locally in the network management system 150.

In step 990, the network management system 150 determines whether remaining edges exist. If one or more edges remain, the network management system 150 may repeat the steps 920-990 until all edges and nodes are included in at least one subtree. Thus, the process 900 partitions edges in the service demand graph into one or more subtrees (i.e. edge subgroup) that may be further processed in the disclosed embodiments.

FIG. 10 is an example tree that are partitioned by the process 900 discussed above. In this example, the subtree 1010A {0, 1, 2, 3} is generated through steps 920-940. The network management system 150 then attempts to add the parent node (i.e. node 9) to the generated subtree. Because the total volume would exceed the service link capacity if all child nodes 4, 5, 6, 7, and 8 are also added, the network management system 150 may extend the subtree 1010A to include the parent node 9 with an edge (3, 9) connecting the parent node with the subtree 1010A, forming an extended subtree 1010B (step 960). After the extended subtree 1010B {0, 1, 2, 3, 9} is subtracted from the rooted tree (step 970), the second subtree 1020 {4, 5, 6, 7, 8, 9} is generated using the similar procedure (steps 920-970).

Figure 11:
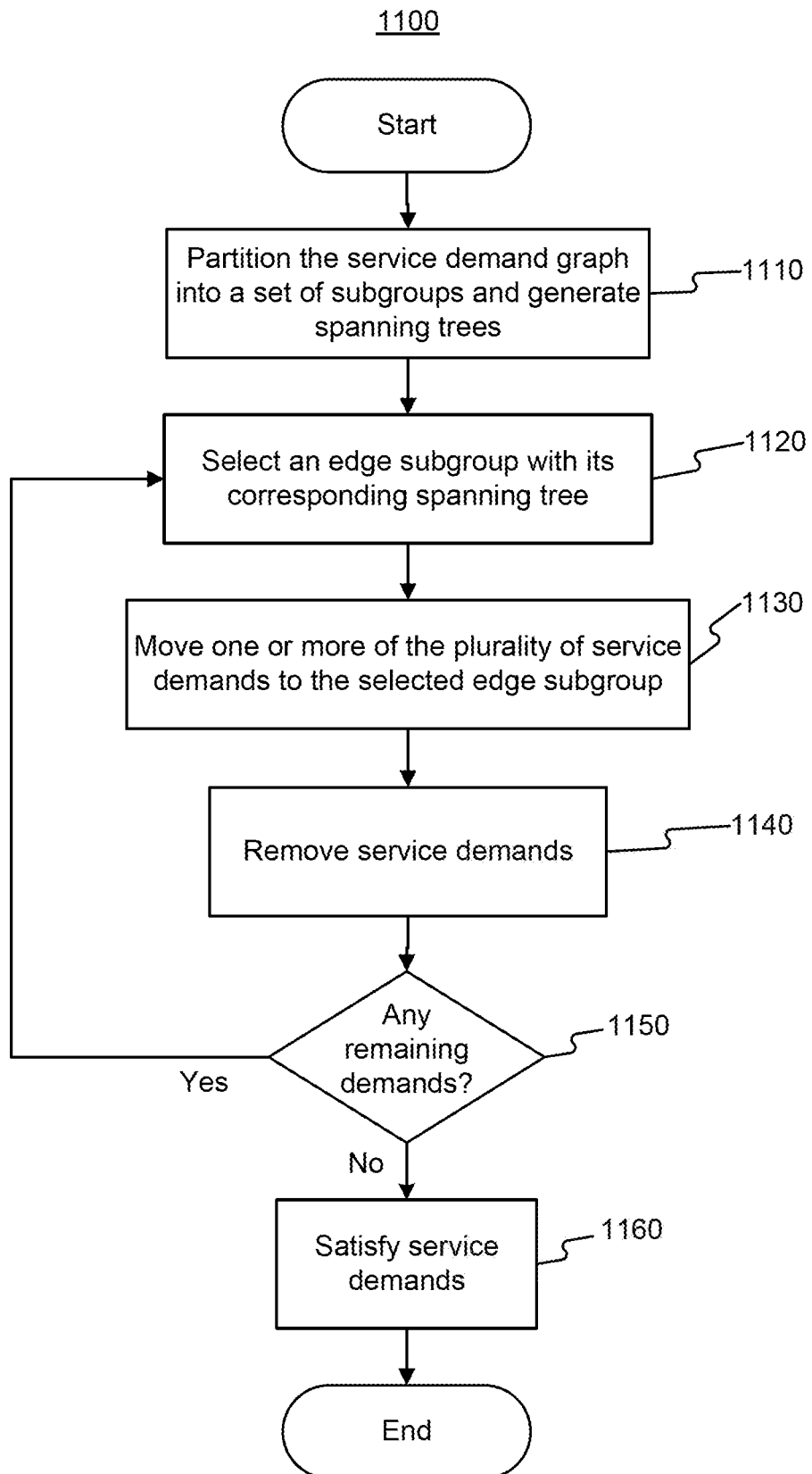
FIG. 11 is a flowchart of another example process for satisfying unprotected service demands, in accordance with embodiments of the present disclosure.

FIG. 11 is a flowchart of another example process 1100 for satisfying unprotected service demands, in accordance with embodiments of the present disclosure. In step 1110, the network management system 150 may partition the service demand graph 500 into a set of edge subgroups and generate their respective spanning trees. In some embodiments, the network management system 150 may utilize steps 610-650 of the process 600 to generate the set of edge groups and corresponding spanning trees.

In step 1120, the network management system 150 may select an edge subgroup with its corresponding spanning tree, based on a parameter R. Parameter R is defined as the number of potential service links (i.e. the number of edges in the spanning tree) divided by the number of service demands (i.e. the number of edges in the corresponding edge subgroup):

$$R = \frac{\#\text{service links}}{\#\text{demands}}$$

In some embodiments, the network management system 150 may calculate a parameter R for each edge group. The network management system 150 may then select the edge subgroup and spanning tree with the lowest parameter R.

For example, the network management system 150 may select edge subgroup 710A and the corresponding spanning tree 810A over the edge subgroup 710B and spanning tree 810B, because the parameter R for edge subgroup 710A and spanning tree 810A is lower. As shown in FIG. 8 and FIG. 7, the number of service demands in the edge subgroup 710A is 8 and the number of edges of the spanning tree in the spanning tree 810A (i.e. the number of potential service links) is 4. Thus, R for subgroup 710A and spanning tree 810A is 0.5. But R for the other subgroup is 1, as the number of edges in the spanning tree 810B is the same as the number of edges in the edge subgroup 710B.

Referring to FIG. 11, in step 1130, network management system 150 may move one or more of the plurality of service demands to the selected edge subgroup. Although the total volume of service demands in each subgroup may be close to the service link capacity, it may be possible to satisfy additional service demands, since not all service links are used by all the service demands. In some embodiments, the network management system 150 may move additional service demands from other edge subgroups to the selected edge subgroup. For example, the service links corresponding to the spanning tree 810A may satisfy additional service demands in the communication network. As illustrated below in Table 4, some service links (in this example, all the service links) in the spanning tree 810A may bear one or more service demands whose total volume is lower than the service demand available capacity (i.e., the remaining capacity after satisfying the service demands in the selected subgroup). In some embodiments, the network management system 150 may modify or regenerate the spanning tree corresponding to the selected edge subgroup to accommodate the additional service demands.

TABLE 4 the total volume on each service link

| Service link | Capacity | Demands | Total volume of Demands |
|---|---|---|---|
| (A, D) | 20 GB | <A, C>, <A, D>, <B, F>, <D, F> | 2 + 4 + 1 + 2 = 9 GB |
| (A, F) | 20 GB | <A, F>, <B, F>, <D, F> | 1 + 1 + 2 = 4 GB |
| (C, D) | 20 GB | <A, C>, <B, D> <B, F>, <C, D> | 2 + 2 + 1 + 2 = 7 GB |
| (B, C) | 20 GB | <B, C>, <B, D>, <B, F> | 5 + 2 + 1 = 8 GB |

For example, an additional service demand {A, B} can be satisfied using the service links corresponding to the spanning tree 810A. The volume of the service demand <A, B> is 7 GB. To satisfy this demand, service links (A, D), (C, D), and (B, C) may be used, where each of the service links has sufficient bandwidth remaining to satisfy the additional service demand <A, B>.

In step 1140, the network management system 150 may remove all the service demands corresponding to the edges in the selected edge subgroup from the service demand graph, including the edges moved to the subgroup in step 1130. The network management system 150 may also store the selected edge subgroup and its corresponding spanning tree in a memory device for further processing.

In step 1150, the network management system 150 determines whether there are remaining service demands in the service demand graph. If such service demands exist, the network management system 150 proceeds to step 1110 and repeats the process until all service demand are removed from the service demand graph.

In step 1160, the network management system 150 may satisfy service demands in all edge subgroups by deploying the service links in accordance with the respective spanning trees. In some embodiments, the network management system 150 may deploy the service links in a similar procedure as described above in step 660 in connection with FIG. 6.

Figure 12:
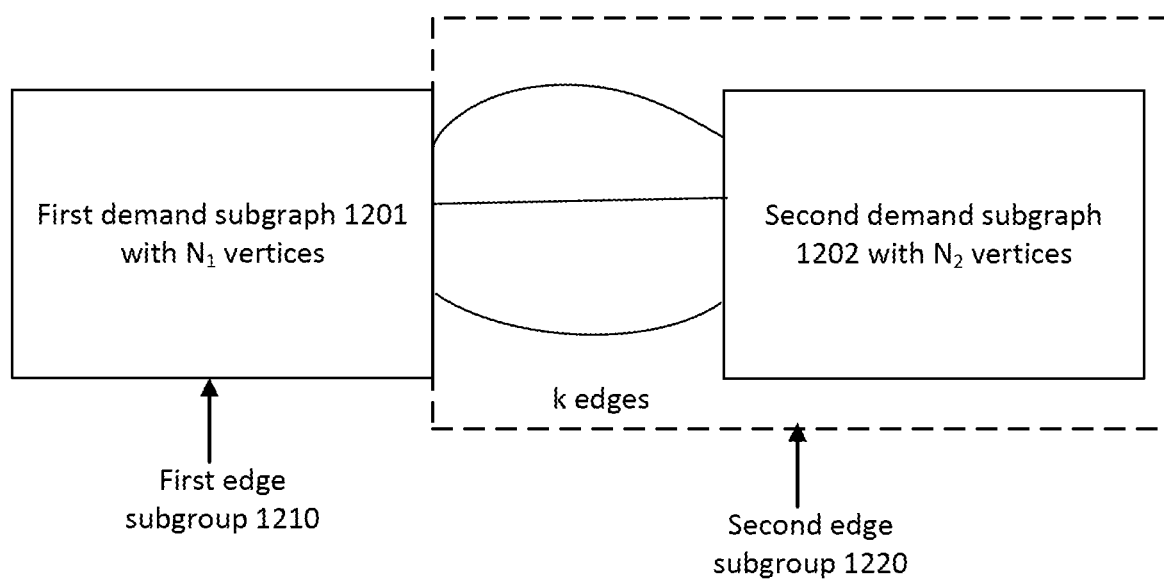
FIG. 12 illustrates an example service demand graph and edge subgroups, consistent with the disclosed embodiments.

FIG. 12 is a diagram illustrating an example service demand graph 1200, consistent with the disclosed embodiments. As shown in FIG. 12, the service demand graph 1200 includes a first subgraph 1201 and a second subgraph 1202, where the first subgraph 1201 includes $N_1$ vertices and the second subgraph 1202 includes $N_2$ vertices. The first subgraph 1201 is connected with the second subgraph 1202 via k edges, where k is a positive integer. The first subgraph 1201 includes a number of $e_1$ edges, and the second subgraph 1202 includes a number of $e_2$ edges. Each of the edges in the first subgraph 1201 has a volume $C_1$ that equals to $$\frac{C_{max}}{e1},$$

where Cmax is the maximum service link capacity. Each of the k edges has a volume $C_3$. Each of the edges in the second subgraph 1202 has a volume $C_2$ that equals to $$\frac{C_{max} - k \cdot C_3}{e2}.$$

Applying the above-described edge partitioning method, the service demand 1200 can be partitioned into a first edge subgroup 1210 and a second edge subgroup 1220. The first edge subgroup 1210 includes all vertices and edges in the first demand subgraph 1201, and the second edge subgroup 1220 includes all vertices and edges in the second demand subgraph 1202 and the k edges connecting between the first subgraph 1201 and second subgraph 1202. After the first and second edge subgroups are determined, the service demands can be satisfied by generating corresponding spanning trees and service links as described above.

A network management system 150 may need to evolve a functioning network by adding new service demands, which can be protected or unprotected. The additional demands can be satisfied by either using the existing service links or by deploying additional service links. Usage of existing resources may be beneficial as it improves efficiency (e.g. lower financial cost, smaller equipment volume, etc.). The network management system 150 may utilize existing service links by finding service link paths with sufficient bandwidth that satisfy one or more of the additional service demands. This process may also be called as compressing demands. In some scenarios, a solution of a communication network may not be available to satisfy all service demands in the network using the existing resources. In some embodiments, the network management system 150 may select a subset of the additional service demands to be compressed to maximize the profit (P). In some embodiments, the profit is defined as the number of demands satisfied. In some embodiments, the profit is defined as the total volume of satisfied service demands. In yet another embodiment, the profit may take into consideration other factors as priorities of service demands.

Figure 13A:
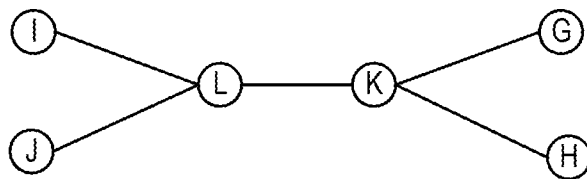
FIG. 13A illustrates an example data communication network where service demands in the network may not be all satisfied.

FIG. 13A illustrates an example data communication network 1300a where service demands in the network may not be all satisfied. In FIG. 13A, vertices G, H, I, J, K correspond to network nodes in the communication network. The edges connecting a pair of vertices are the service links connecting the corresponding pair of network nodes. If the volumes of unprotected service demands <J, G> and <I, H> are 15 GB and the capacity of each service link is 20 GB, the service demands <J, G> and <I, H> cannot be both satisfied because both service demands use the service link (K, L) whose capacity is 20 GB, lower than the total volume of the service demands. The network management system 150 may select to satisfy either service demand <J, G> or service demand <I, H> based on the profit associated with each service demand using the process 1400 described below.

Figure 13B:
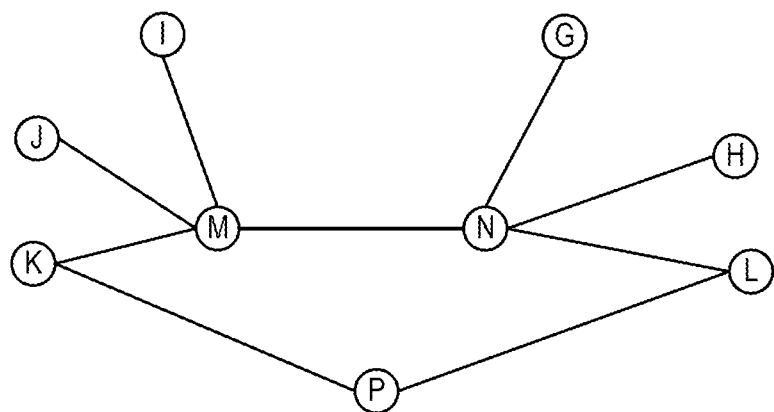
FIG. 13B illustrates an example data communication network where the order of satisfying the service demands may impact whether all service demands may be satisfied.

FIG. 13B illustrates another example data communication network 1300b where the order of satisfying the service demands may impact whether all service demands can be satisfied. As shown in FIG. 13B, the vertices correspond to network nodes and the edges correspond to the service links connecting the network nodes. In this example network, the volume of service demand <J, H> is 8 GB, <K, L> is 14 GB, and <I, G> is 10 GB. If a service link path (K-M-N-L) is first established to satisfy service demand <K, L>, service demands <J, H> and <I, G> cannot be further satisfied, because no service link path connecting the end nodes can be established without exceeding the capacity of at least one service link (20 GB). But if the network management system 150 uses process 1400 described below to first satisfy service demand <J, H> using service link path (J-M-N-H), additional service link path may be established to satisfy other service demands. For example, service link path (I-M-N-G) can be used for service demand <I, G> and service link path (K-P-L) can be used for service demand <K, L> without exceeding the capacity of each service link.

Figure 14:
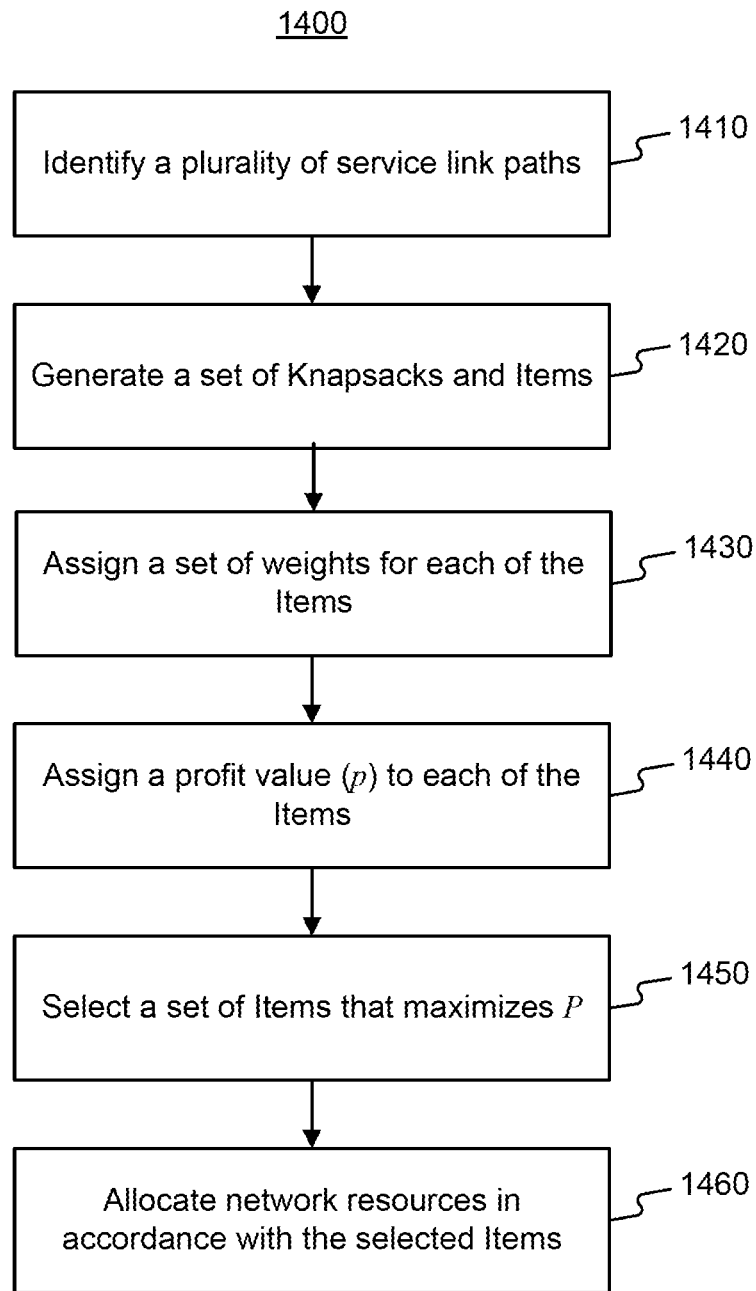
FIG. 14 is a flowchart of an example process for selecting certain service link paths and service demands, in accordance with embodiments of the present disclosure.

FIG. 14 is a flowchart of an example process 1400 of selecting one or more service link paths for unprotected service demands to maximize profit. Referring to FIG. 14, in step 1410, the network management system 150 identifies a plurality of service link paths. As explained above, a service link path is a set of service links selected to satisfy a certain demand. Each service link paths I(d) is thus associated with a service demand d, and utilizes at least one service link. The network management system 150 may identify such service link paths using any path finding algorithm (e.g., Dijkstra's algorithm or Yen's algorithm for K-shortest paths). For example, in the data communication network 1300 shown in FIG. 13B, the network management system 150 may identify that service link paths (K-P-L) and (K-M-N-L) can be used to satisfy service demand <K, L>; service link paths (J-M-N-H) and (J-M-K-P-L-N-H) can be used to satisfy service demand <J, H>; and service link paths (I-M-N-G) and (I-M-K-P-L-N-G) can be used to satisfy service demand <I, G>.

In step 1420, the network management system 150 generates a set of Knapsacks and Items. In some embodiment, the network management system 150 may create a Knapsack for each of the service links in the communication network. The set of Knapsacks is referred as $\{k_1, k_2, \ldots k_m\}$. Each Knapsack may be associated with a Maximum Total Weight, $W(k_j)$, which equals to or is proportionate to the capacity of the corresponding service link. For example, in the data communication network 1300 shown in FIG. 13, the network management system 150 may generates nine Knapsacks $\{k_1, k_2, \ldots k_9\}$ corresponding to the service links (I, M), (J, M), (K, M), (K, P), (P, L), (N, L), (N, H), (N, G), and (M, N) respectively. In some embodiments, the network management system 150 may generate an Item for each of service link path. The set of Items is referred as $\{I_1, I_2, \ldots I_n\}$. Thus, each Item is associated with a service link path, which is associated with a service demand. Each Item may also be associated with a set of Weights, each of the Weights is further associated with a Knapsack. For example, $w(I_i, k_j)$ designates a Weight of Item $I_i$ on the Knapsack $k_j$. In some embodiments, the network management system 150 may set $w(I_i, k_j)$ as the volume that the service demand associated with the Item $I_i$ would inflict on the service link associated with the Knapsack $k_j$.

In some embodiments, the network management system 150 may treat an Item selection problem as a Multidimensional Knapsack Problem (MKP). The objective of MKP is to pick some of the items, with maximal total profit, while obeying that the maximum total of the chosen items must not exceed the weight limit of each knapsack. A person of ordinary skill in the art would understand that existing algorithms can be utilized to solve MKP, such as the Constant Rank Greedy Algorithm disclosed by Dobson in "Worst-Case Analysis of Greedy Heuristics for Integer Programming with Nonnegative Data," *Math. Oper. Res.*, vol. 7, no. 4, pp. 515-531, June 1982, which is incorporated herein by reference. In some embodiments, the network management system 150 may utilize a dynamic version of the Greedy Algorithm, which updates the internal rank after each Item selection. For example, in the data communication network 1300 shown in FIG. 13, the network management system 150 may generate six Items $\{I_1, I_2, \ldots I_n\}$ corresponding to the six service link paths identified in step 1210, i.e., (K-P-L), (K-M-N-L), (J-M-N-H), (J-M-K-P-L-N-H), (I-M-N-G), and (I-M-K-P-N-L) respectively. Thus, each Item is associated with a service link path, which is further associated with a service demand. For example, $I_1$ may be associated with service link path (K-P-L), which is further associated with service demand <K, L>.

In step 1430, the network management system 150 assigns a set of weights to each Item in this step. For example, the network management system 150 may assign a set of weights w($I_1$, $k_{1-9}$) to item I. In this example, w($I_1$, $k_1$) means a weight that Item 1 (corresponding to service link path (K-P-L)) may impose on the Knapsack 1 (corresponding to service link (I, M)). Because the service link path (K-P-L) does not use the service link (I, M), the network management system 150 may set w(I, k) as 0. Similarly, the network manage system may set w(I, $k_4$) as 14 because the service link path (K-P-L) uses the service link (K, P) and the volume of the service demand <K, L> is 14 GB.

In step 1440, the network management system 150 assigns a profit value (p) to each of the Items {$I_1, I_2, \ldots I_n$}. As explained above, different embodiments may have different definition of profits. The profit value assigned to each service link path thus may vary from embodiment to embodiment. In some embodiments, for example, the overall profit may be defined as the number of satisfied service demands. In these embodiments, the profit value assigned to each service link path is one (1). For example, in the data communication network 1300b shown in FIG. 13B, the network management system 150 may set p($I_1$) as 1 if the overall profit is defined as the number of satisfied service demands. In some embodiments, the network management system 150 may assign to each service link path the volume of the corresponding service demand as the profit value.

In step 1450, the network management system 150 selects a set of Items that maximizes P. In some embodiments, the network management system 150 selects the set of service link paths by finding a set x satisfying the following formula:

$$\max \sum_{i=1}^{n} p(I_i)x_i \text{ such that:}$$

$$\sum_{i=1}^{n} w(I_i, k_j)x_i < W(k_j), \text{ for every } j = 1, \ldots, m; (x_i = 0, 1)$$

Parameter n is the number of service demands in the communication network and parameter m is the number of service links in the communication network.

As discussed above, more than one service link path may be available for satisfying one service demand. In some embodiments, the network management system 150 may select at most one Item (service link path) for each unprotected service demand. This may be achieved by adding additional n Knapsacks with maximal weight of one (1), such that all the Items I that correspond to the same service demand have a weight w($I_1$, $k_j$)=1 on Knapsack $k_j$ that represents this demand, and zero otherwise. This ensures that no more than one Item is selected per service demand. For example, in the data communication network 1300 shown in FIG. 13, the network management system 150 may select items $I_1$, $I_3$, and $I_5$ corresponding to service link paths (K-P-L), (I-M-N-G), and (J-M-N-H) respectively using the Dynamic Greedy Algorithm.

In step 1460, the network management system 150 allocates network resources in accordance with the selected Items. In some embodiments, the network management system 150 may assign network resources associated with the service link paths to the selected Items, satisfying the corresponding service demands.

Figure 15:
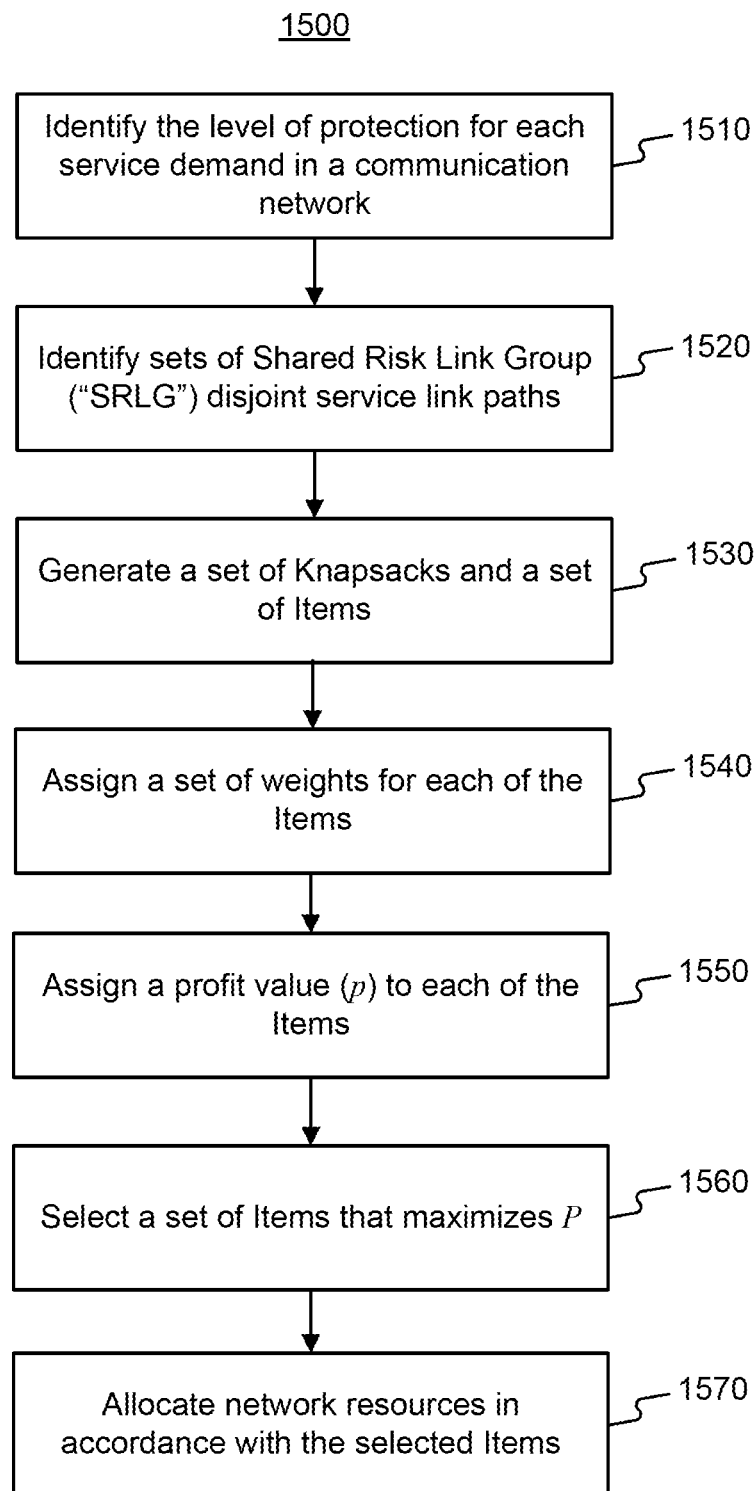
FIG. 15 is a flowchart of an example process for selecting certain service link paths and service demands, in accordance with embodiments of the present disclosure.

FIG. 15 is a flowchart of an example process 1500 to compress protected service demands. In step 1510, the network management system 150 identifies the level of protection for each service demand in a communication network. There are various possible levels of protection, each of which may have different requirement over Shared Risk Link Group ("SRLG") disjoint service link paths. A shared risk link group is a set of links sharing a common resource, which affects all links in the set if the common resource fails. For example, the service links (A, D) and (C, D) in FIG. 8 are in an SRLG, because the service links may share a common resource, i.e. the link connecting network nodes B and D, as shown in FIG. 3. Two service link paths are disjoint where the two service links do not share any common resources. In this disclosure, disjoint service link paths refer to service link paths that are not in an SRLG. For example, a 1+1 level of protection requires two disjoint service link paths for each demand; a 1+1+R level of protection requires two SRLG disjoint paths and an available restoration path if both of the disjoint paths fail; and a 1++ level of protection requires two disjoint paths for each demand, and two disjoint paths to be available if one of the existing disjoint paths fails. A person of skill in the art would appreciate that other levels of protection may be implemented, requiring different numbers of disjoint service link path.

In step 1520, the network management system 150 identifies sets of disjoint service link paths for each protected service demand based on the protection level.

In step 1530, the network management system 150 generates a set of Knapsacks and a set of Items. In some embodiments, the network management system 150 may generate a Knapsack in the same procedure as discussed above in connection with FIG. 14. In some embodiments, the network management system 150 may generate an Item in the same procedure as discussed above in connection with FIG. 14, except that each Item, instead of being associated with a single service link path, is associated with a set of SRLG disjoint service link paths.

In step 1540, the network management system 150 assigns a set of weights to each Item. In some embodiments, the network management system 150 may assign a set of weights to each Item in the same procedure as discussed above in connection with FIG. 14, except that for each Item, instead of assigning a weight to each service link in a single service link path, a weight is assigned to each service link in each SRLG disjoint service link paths. In step 1550, the network management system 150 assigns a profit value (p) to each of the Items {$I_1, I_2, \ldots I_n$}. In some embodiments, the network management system 150 may assign profits in the same procedure as discussed above in connection with FIG. 14. In step 1560, the network management system 150 selects a set of Items that maximizes P. In some embodiments, the network management system 150 may select the set of Items in the same procedure as discussed above in connection with FIG. 14.

In step 1570, the network management system 150 allocates network resources in accordance with the selected Items. In some embodiments, the network management system 150 may allocate network resources in the same procedure as discussed above in connection with FIG. 14.

Figure 16:
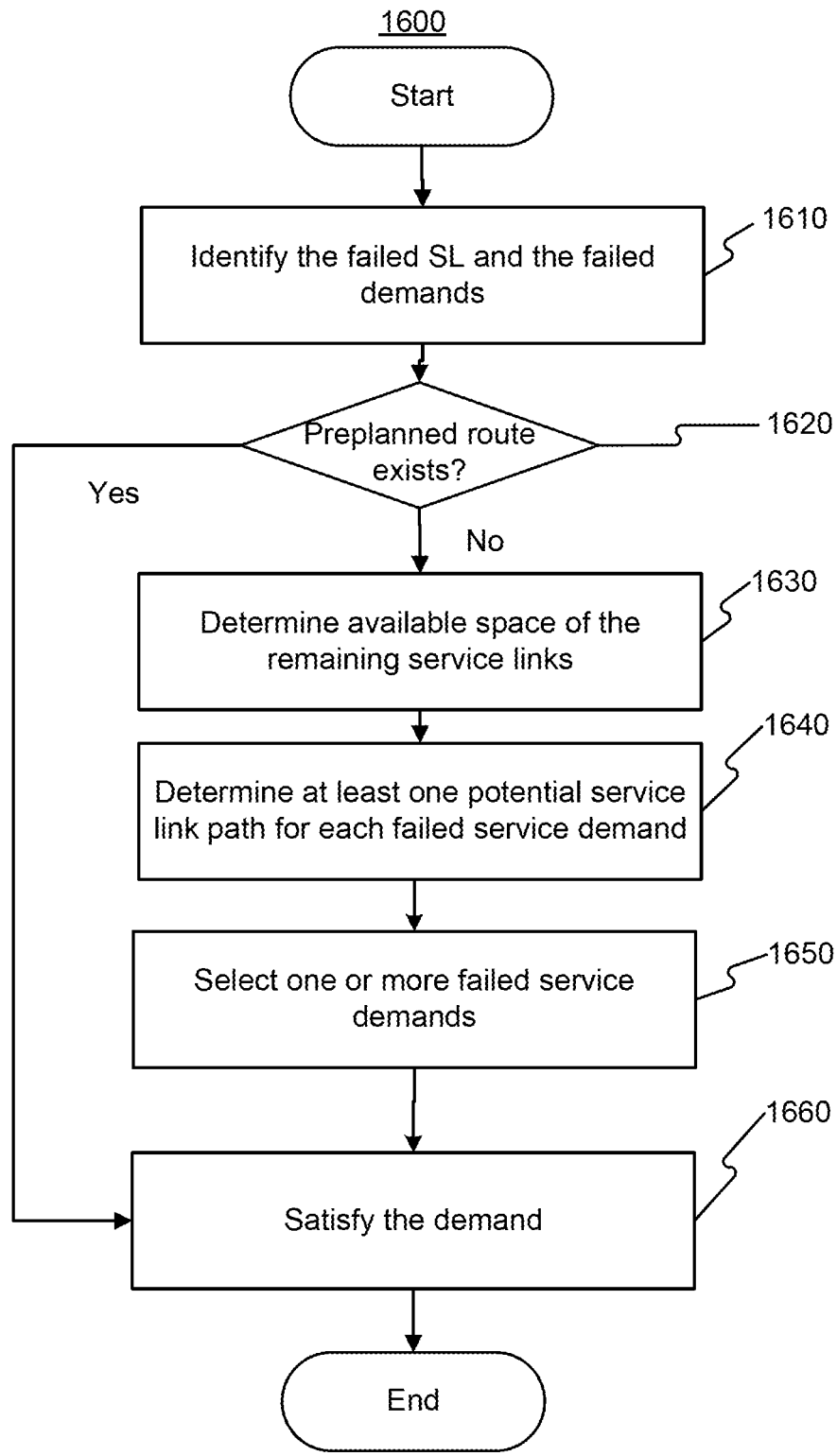
FIG. 16 is a flowchart of an example process for restoring service demands when one or more fails occur in a data communication network, consistent with the disclosed embodiments.

FIG. 16 is a flowchart of an example process 1600 for restoring service demands in a data communication network when one or more failures occur, consistent with the disclosed embodiments. The steps associated with this example process is described in relation to a network management system, such as network management system 150 of FIG. 1. One of ordinary skill in the art would appreciate that the steps associated with this example process may also be performed by, for example, a processor of the network devices 120 or a server of the data communication network. The example process 1500 allows service demands to be restored by using remaining available service links when one or two service links assigned to the service demands fail.

In step 1610, the network management system 150 identifies one or more failed service links and failed demands. In some examples, a failed service link may occur where one or more physical links serving some service links are disrupted. In some other examples, a failed service link may occur as a result of a failed network node. As described above, each service link may serve one or more service demands associated with the service link. A failure of the service link may also cause the failure of the corresponding one or more service demands. One skilled in the art would appreciate that there are known techniques to detect such failures of service links and of service demands.

In step 1620, the network management system 150 determines whether a pre-planned route exists for each failed demand. A pre-planned route is a service link path reserved for the affected service demand. Depending on the protection level, a service demand may be associated with no pre-planned route, one pre-planned route, or more than one pre-planned route as explained above. If such pre-planned route exists and none of the service links in the preplanned route is failed, the process proceeds to step 1650. If such pre-planned route does not exist or a failure occurs to one or more service links in the pre-planned route, the process proceeds to step 1630. In some implementations, none of the service demands in the network has any preplanned backup routes. In such implementations, the step 1620 may be omitted, or the determination of the step 1620 is a "No" and proceeds to the step 1630.

In step 1630, the network management system 150 determines available space of the remaining service links. The free space may depend on the configuration of the network as reserving or non-reserving. In reserving embodiments, the network may reserve network resources of the service links for the failed service link path associated with the failed demands. Alternatively, the network may reserve no network resource for the failed demands. For example, a service demand <A, C> may use service link (A, D) and (C, D). In reserving embodiments, when service link (A, D) fails, the network resources of service link (C, D) may be reserved for the service demand <A, C> and are not available for other service demands, even though the reserved resources will not be used until the failure of service link (A, D) is cleared. In non-reserving embodiments, however, the network resources of service link (C, D) may be freed and available for other service demands.

In step 1640, the network management system 150 determines at least one potential service link path for each failed service demand. If a single path is requested for each demand, standard path finding algorithms, for example Dijkstra's or Bellman-Ford's algorithms, can be used, where a search is performed on the graph of the available service links. If more than one path is requested (for example in the case of 1++ protection scheme), an iterative path finding algorithm or other methods such as an Integer Linear Programming (ILP) solver may be applied.

In step 1650, the network management system 150 may select one or more failed service demands. Ideally, all failed service demands need to be rerouted. However, the overall network resource in a given communication network may not be sufficient for all the failed service demands. In such scenarios, the network management system 150 may prioritize to satisfy a selected set of service demands. The procedure of selecting the service demands may be similar to the process 1400 or 1500 explained above.

In step 1660, the network management system 150 satisfies the demand in a manner similar to the process discussed above in referring to FIG. 14. After the service link paths are selected, the network management system 150 reroutes the service demands utilizing the service links. In some embodiments, the network management system 150 in the process 1600 may be a central computation device. A central computation device may reach an optimal reroute plan given its better computation power and the ability to control all the nodes in the communication network. However, in such embodiments, a failure of the central computation device may cause the failure of the entire communication network. In some embodiments, the network management system 150 may be a set of distributed computation devices, such as a headend device. A headend device may have limited computation resources and may control only a part of the communication network. In such embodiments, a reroute plan may not be optimal, but the communication network may less depend on a central device and a reroute plan deployment may be faster and more flexible. In some embodiments, the communication network may use both central and distributed computation devices to reroute the failed demands.

In some embodiments, the network management system 150 may restore the communication network when the failures are cleared. In some embodiments where network resources for the failed service demands are reserved, the network management system 150 may restore network by reverting the failed service demands back to the original service link paths. In some other embodiments where the network resources are not reserved for the failed demands, the restoration of the communication network may be more complicated, requiring migration algorithms and procedures. Such migration algorithm and procedures are explained in detail in U.S. Pat. No. 10,389,584, titled "Migrating Services in Data Communication Networks," which is incorporated here in its entirety.

Figure 17:
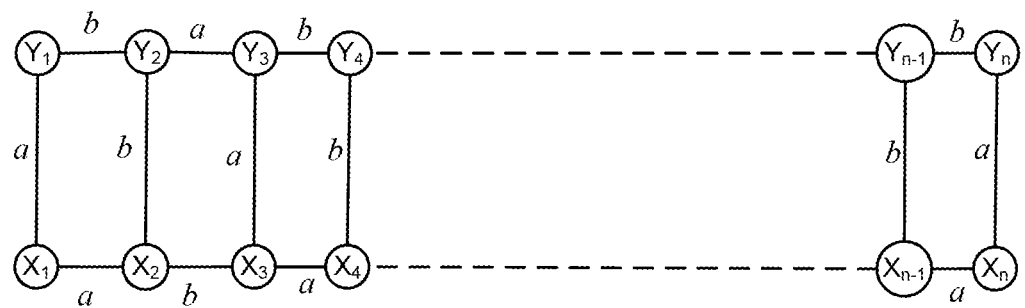
FIG. 17 illustrates an example data communication network for satisfying service demands, consistent with the disclosed embodiments.

In some embodiments, the network management system 150 may selectively satisfy service demands in a communication network with any number of nodes, especially with a large number of nodes. FIG. 17 illustrates an example data communication network 1700 consistent with such embodiments. In this example, there are a plurality of service demands in the network, including a demand on every edge of the network, where each demand has a volume of a. For example, there are service demands between vertices <$X_1$, $X_2$>, <$X_2$, $X_3$>, . . . , <$X_{n-1}$, $X_n$>, <$Y_1$, $Y_2$>, <$Y_2$, $Y_3$>, . . . , <$Y_{n-1}$, $Y_n$>, <$X_1$, $Y_1$>, <$X_2$, $Y_2$>, . . . , <$X_n$, $Y_n$>. There are also service demands between the vertices in diagonal positions <$Y_1$, $X_2$>, <$Y_2$, $X_3$>, . . . , <$Y_{n-1}$, $X_n$>, where each demand has a volume of a. As shown in FIG. 17, the edges in the network 1700 each have a capacity limit a or b, where b≥3a. For example, the capacity on the edges ($X_1$, $Y_1$), ($X_2$, $Y_2$), . . . , ($X_n$, $Y_n$) alternates between a and b. The capacity on the edges ($X_1$, $X_2$), ($X_2$, $X_3$), . . . , ($X_{n-1}$, $X_n$) also alternates between a and b, and the capacity on the edges ($Y_1$, $Y_2$), ($Y_2$, $Y_3$), . . . ($Y_{n-1}$, $Y_n$) alternates between b and a. In the network 1700, each demand can be satisfied by multiple service link path options. For example, demand <$X_1$, $Y_1$> can be satisfied with routes ($X_1$, $Y_1$) and ($X_1$, $X_2$, $Y_2$, $Y_1$). As another example, demand <$X_2$, $Y_2$> can be satisfied with service link paths ($X_2$, $Y_2$), ($X_2$, $X_1$, $Y_1$, $Y_2$), and ($X_2$, $X_3$, $Y_3$, $Y_2$). As explained above, the network management system may satisfy the demand using Constant Rank Greedy Algorithm or Dynamic Greedy Algorithm. For example, the network management system may calculate an R value based on Greedy Algorithm for each potential service link path i according to the following formula:

$$R_i = \frac{P_i}{\sum_k \frac{C_{i,k}}{W_k}}$$

In the formula, $P_i$ is the profit associated with the service link path i. $C_{i,k}$ is the weight of service link path i on knapsack (service link) k. If service link path i does not use service link k, then $C_{i,k}$ is zero. $W_k$ is the total capacity of service link k. The network management system then may select the service link path with the highest R value and repeat the process until no more service link path can be selected without exceeding any service link capacity.

Figure 18:
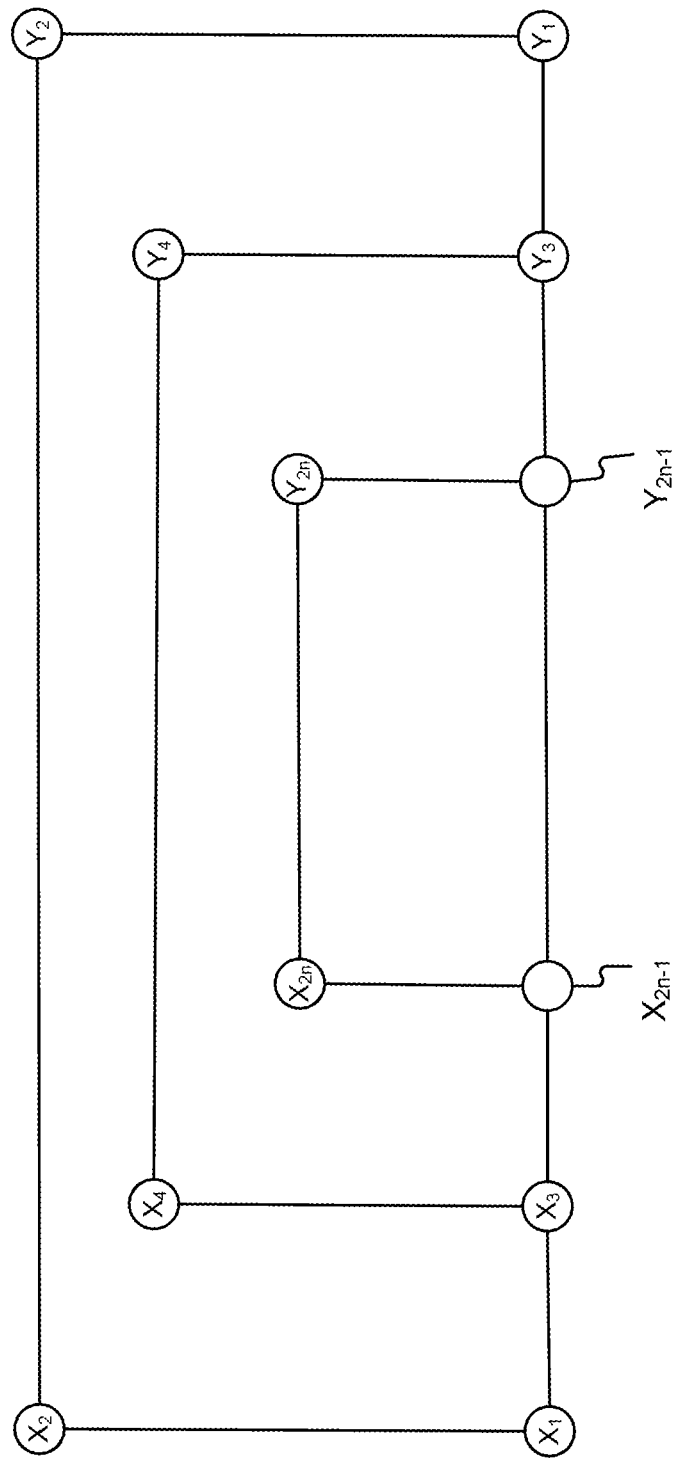
FIG. 18 illustrates another example data communication network for satisfying service demands, consistent with the disclosed embodiments.

In some embodiments, the network management system may selectively satisfy a service demand in a communication network using specific service link paths. FIG. 18 illustrates an example network 1800. In this example network, there are given service links on all the edges of the network, with a uniform capacity $C_{max}$. For example, there may be several sets of service demands. Demands of the form $<X_i, Y_i>$ for odd i (i=1, 3, 5 . . . ), with requested volume of $k*C_{max}$, where k is a number in the range [0,1], and another set of service demands for the same endpoints (i.e. $<X_i, Y_i>$ for odd i), with a requested volume of $$\frac{C_{max}}{n}$$

where n is a quarter of number of nodes in the communication network 1800. Another set of demands is between endpoints $<X_i, Y_i>$ for even i (i=2, 4, 6 . . . ) with requested volume of $(1-k)*C_{max}$.

In this example, each of the service demands $<X_i, Y_i>$ can be satisfied by one of several service link paths. Each of the demands $<X_1, Y_1>$ can be satisfied, for example, by $(X_1, X_2, Y_2, Y_1)$ or $(X_1, X_3 \ldots X_{2n-1}, Y_{2n-1}, \ldots Y_3, Y_1)$, as well as other optional paths. Similarly, in this example, the service demand $<X_2, Y_2>$ can be satisfied by the service link path $(X_2, Y_2)$ or $(X_2, X_1, Y_1, Y_2)$. By assigning the service links using the method described above in connection with FIG. 14, the network management system may satisfy all the service demands in the network 1800 under the constraint of the maximum capacity limit of the service links.

In example embodiments, a non-transitory computer-readable storage medium including instructions is also provided, and the instructions may be executed by a device (such as a computer), for performing the above-described methods. For example, the non-transitory computer-readable storage medium may be a read-only memory (ROM), a Random Access Memory (RAM), an electrically erasable programmable read-only memory (EEPROM), Programmable Array Logic (PAL), a disk, an optical disc, a Digital Versatile Disc (DVD), and so on.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A method of satisfying demands in a data communication network utilizing a set of service links, the method comprising:
   identifying a plurality of service link paths,
   wherein each of the plurality of service link paths corresponds to one of a first plurality of service demands,
   wherein each of the first plurality of service demands is associated with a weight; wherein each of the set of service links is associated with a plurality of weights, each of the plurality of weights is associated with a service demand; and a P value is assigned to each of the first plurality of service demands;
   determining a protection level for one or more of the first plurality of service demands;
   assigning one of the first plurality of service demands with one or more of the plurality of service link paths based on the determined protection level;
   selecting a second plurality of service demands from the first plurality of service demands based on the weight associated with each of the first plurality of service demands, the plurality of weights associated with each of the set of service links, and the P value assigned to each of the first plurality of service demands,
   wherein a sum for each of a plurality of weights associated with the second plurality of service demands is less than or equal to a predetermined value associated with each of the service links, and
   wherein a sum of P values associated with demands of the second plurality of service demands is maximized; and
   satisfying the second plurality of service demands using at least one of the set of service links.

2. The method of claim 1, wherein the second plurality of service demands is selected according to a multidimensional knapsack problem algorithm.

3. The method of claim 1, wherein the P values are equal to 1.

4. The method of claim 1, wherein the P values are each equal to volumes of the first plurality of service demands associated with the P values.

5. The method of claim 1, wherein the P values are associated with an additive metric of the first plurality of service demands.

6. The method of claim 1, wherein the first plurality of service demands includes one or more protected demands, and at least two service link paths from the plurality of service link paths correspond to each of the protected demands.

7. The method of claim 1, wherein the second plurality of service demands is the same as the first plurality of service demands.

8. The method of claim 7, wherein:
   the first plurality of service demands includes a first demand between vertices $X_1$ and $X_2$, a second demand between vertices $X_1$ and $Y_1$, a third demand between vertices $X_2$ and $Y_2$, a fourth demand between vertices $Y_1$ and $Y_2$, a fifth demand between vertices $X_2$ and $Y_1$, each demand having a volume of a,
   wherein $X_1$, $X_2$, $Y_1$, and $Y_2$ are nodes in the data communication network, and vertices $X_1$ and $X_2$ are directly connected by a first edge, vertices $X_1$ and $Y_1$ are directly connected by a second edge, vertices $Y_1$ and $Y_2$ are directly connected by a third edge, vertices

29

X₂ and Y₂ are directly connected by a fourth edge, and vertices X₂ and Y₁ are connected via vertex Y₂ or vertex X₁, each of the first and second edges having a remaining capacity of a, each of the third and fourth edges having a remaining capacity of b, b having a value of at least three times of a, and wherein the first, second, third, fourth and fifth demands are satisfied using the remaining capacity on the first, second, third, and fourth edges.

9. The method of claim 7, wherein:

the data communication network includes vertices $X_1$, $X_2$, $X_3$, $X_4$, $Y_1$, $Y_2$, $Y_3$, $Y_4$, the data communication network further includes nine edges, the nine edges including a first edge connecting between vertices $X_1$ and $X_2$, a second edge connecting between vertices $X_2$ and $Y_2$, a third edge connecting between vertices $Y_1$ and $Y_2$, a fourth edge connecting between vertices $X_1$ and $X_3$, a fifth edge connecting between vertices $X_3$ and $Y_3$, a sixth edge connecting between vertices $Y_3$ and $Y_1$, a seventh edge connecting between vertices $X_3$ and $X_4$, an eighth edge connecting between vertices $X_4$ and $Y_4$, and a ninth edge connecting between vertices $Y_3$ and $Y_4$, each of the nine edges has a maximum link capacity of $C_{max}$, wherein the first plurality of service demands includes a first demand between vertices $X_1$ and $Y_1$, a second demand between vertices $X_1$ and $Y_1$, a third demand between vertices $X_2$ and $Y_2$, a fourth demand between vertices $X_3$ and $Y_3$, a fifth demand between vertices $X_3$ and $Y_3$, and a sixth demand between vertices $X_4$ and $Y_4$, wherein each of the third demand and the sixth demand has a volume of $k*C_{max}$, k being a ratio between 0 and 1, each of the first demand and the fourth demand has a volume of $(1-k)*C_{max}$, and each of the second demand and the fifth demand has a volume of $$\frac{C_{max}}{2},$$

and wherein the first, second, third, fourth, fifth and sixth demands are satisfied based on the nine edges.

10. A method of rerouting service demands in a data communication network upon one or more failures, the method comprising:

identifying one or more failed service links;

identifying a second plurality of service demands among a first plurality of service demands, each of the second plurality of service demands associated with the one or more failed service links;

identifying a third plurality of service demands among the second plurality of service demands, wherein for each of the third plurality of service demands, a pre-planned route that does not use the failed service links is unavailable;

determining one or more of the third plurality of service demands are satisfied using available service links;

identifying one or more candidate routes for each of the one or more of the third plurality of service demands, where a candidate route comprises non-failed service links, each of the third plurality of service demands is associated with a weight, each of the available service links is associated with a plurality of weights, each of the plurality of weights is associated with a service demand, and a P value is assigned to each of the third plurality of service demands;

determining a protection level for one or more of the third plurality of service demands;

assigning one of the third plurality of service demands with one or more of the available service links based on the determined protection level;

selecting a set of service demands from the third plurality of service demands based on the weight associated with each of the third plurality of service demands, the plurality of weights associated with each of the available service links, and the P value assigned to each of the third plurality of service demands, wherein a sum of P values associated with the set of service demands is maximized, wherein the selected set of service demands is associated with one or more of the available service links, each service link of the one or more of the available service links is associated with one or more service demands of the selected set of service demands, and for each service link of the one or more of the available service links, a total volume of the associated one or more service demands does not exceed a free space of the corresponding service link; and rerouting the selected set of service demands based on the identified candidate routes.

11. The method of claim 10, wherein the method is performed by a central computation device.

12. The method of claim 10, wherein the method is performed by one or more distributed computation devices.

13. The method of claim 10, wherein a space of one or more of the available service links is reserved for each of the second plurality of service demands.

14. The method of claim 10, wherein a space of each of the available service links is not reserved for each of the second plurality of service demands.

15. A system for satisfying demands in a data communication network utilizing a set of service links, the system comprising:

at least one processor; and at least one memory containing instructions that, when executed by the at least one processor, cause the system to perform operations comprising:

identifying a plurality of service link paths, wherein each of the plurality of service link paths corresponds to one of a first plurality of service demands, wherein each of the first plurality of service demands is associated with a weight, wherein each of the set of service links is associated with a plurality of weights, each of the plurality of weights is associated with a service demand, and wherein a P value is assigned to each of the first plurality of service demands;

determining a protection level for one or more of the first plurality of service demands;

assigning one of the first plurality of service demands with one or more of the plurality of service link paths based on the determined protection level;

selecting a second plurality of service demands from the first plurality of service demands based on the weight associated with each of the first plurality of service demands, the plurality of weights associated with each of the set of service links, and the P value assigned to each of the first plurality of service demands, wherein a sum for each of a plurality of weights associated with the second plurality of service demands is less than or equal to a predetermined value associated with each of the plurality of service demands, and wherein a sum of P values associated with demands of the second plurality of service demands is maximized; and satisfying the second plurality of service demands using at least one of the set of service links.

16. The system of claim 15, wherein the second plurality of service demands is selected according to a multidimensional knapsack problem algorithm.

17. The system of claim 15, wherein the P values are equal to 1.

18. The system of claim 15, wherein the P values are each equal to volumes of the first plurality of service demands associated with the P values.

19. The system of claim 15, wherein the first plurality of service demands includes one or more protected demands, and at least two service link paths from the plurality of service link paths correspond to each of the protected demands.

20. The system of claim 15, wherein the second plurality of service demands is the same as the first plurality of service demands.

21. The system of claim 20, wherein:
the first plurality of service demands includes a first demand between vertices $X_1$ and $X_2$, a second demand between vertices $X_1$ and $Y_1$, a third demand between vertices $X_2$ and $Y_2$, a fourth demand between vertices $Y_1$ and $Y_2$, a fifth demand between vertices $X_2$ and $Y_1$, each demand having a volume of a,
wherein $X_1$, $X_2$, $Y_1$, and $Y_2$ are nodes in the data communication network, and vertices $X_1$ and $X_2$ are directly connected by a first edge, vertices $X_1$ and $Y_1$ are directly connected by a second edge, vertices $Y_1$ and $Y_2$ are directly connected by a third edge, vertices $X_2$ and $Y_2$ are directly connected by a fourth edge, and vertices $X_2$ and $Y_1$ are connected via vertex $Y_2$ or vertex $X_1$, each of the first and second edges having a remaining capacity of a, each of the third and fourth edges having a remaining capacity of b, b having a value of at least three times of a, and
wherein the first, second, third, fourth and fifth demands are satisfied using the remaining capacity on the first, second, third, and fourth edges.

22. The system of claim 20, wherein:
the data communication network includes vertices $X_1$, $X_2$, $X_3$, $X_4$, $Y_1$, $Y_2$, $Y_3$, $Y_4$, the data communication network further includes nine edges, the nine edges including a first edge connecting between vertices $X_1$ and $X_2$, a second edge connecting between vertices $X_2$ and $Y_2$, a third edge connecting between vertices $Y_1$ and $Y_2$, a fourth edge connecting between vertices $X_1$ and $X_3$, a fifth edge connecting between vertices $X_3$ and $Y_3$, a sixth edge connecting between vertices $Y_3$ and $Y_1$, a seventh edge connecting between vertices $X_3$ and $X_4$, a eighth edge connecting between vertices $X_4$ and $Y_4$, and a ninth edge connecting between vertices $Y_3$ and $Y_4$, each of the nine edges has a maximum link capacity of $C_{max}$,
wherein the first plurality of service demands includes a first demand between vertices $X_1$ and $Y_1$, a second demand between vertices $X_1$ and $Y_1$, a third demand between vertices $X_2$ and $Y_2$, a fourth demand between vertices $X_3$ and $Y_3$, a fifth demand between vertices $X_3$ and $Y_3$, and a sixth demand between vertices $X_4$ and $Y_4$,
wherein each of the third demand and the sixth demand has a volume of $k*C_{max}$, k being a ratio between 0 and 1, each of the first demand and the fourth demand has a volume of $(1-k)*C_{max}$, and each of the second demand and the fifth demand has a volume of $$\frac{C_{max}}{2},$$

and
wherein the first, second, third, fourth, fifth and sixth demands are satisfied based on the nine edges.

23. A system for rerouting service demands in a data communication network upon one or more failures, comprising:
at least one processor; and
at least one memory containing instructions that, when executed by the at least one processor, cause the system to perform operations comprising:
identifying one or more failed service links;
identifying a second plurality of service demands among a first plurality of service demands, each of the second plurality of service demands associated with the one or more failed service links;
identifying a third plurality of service demands among the second plurality of service demands, wherein for each of the third plurality of service demands, a pre-planned route that does not use the failed service links is unavailable;
determining one or more of the third plurality of service demands are satisfied using available service links;
identifying one or more candidate routes for each of the one or more of the third plurality of service demands, where a candidate route comprises non-failed service links, each of the third plurality of service demands is associated with a weight, each of the available service links is associated with a plurality of weights, each of the plurality of weights is associated with a service demand, and a P value is assigned to each of the third plurality of service demands;
determining a protection level for one or more of the third plurality of service demands;
assigning one of the third plurality of service demands with one or more of the available service links based on the determined protection level;
selecting a set of service demands from the third plurality of service demands based on the weight associated with each of the third plurality of service demands, the plurality of weights associated with each of the available service links, and the P value assigned to each of the third plurality of service demands, wherein a sum of P values associated with the set of service demands is maximized,
wherein the selected set of service demands is associated with one or more of the available service links, each service link of the one or more of the available service links is associated with one or more service demands of the selected set of service demands, and for each service link of the one or more of the available service links, a total volume of the associated one or more service demands does not exceed a free space of the corresponding service link; and
rerouting the selected set of service demands based on the identified candidate routes.

24. The system of claim 23, wherein the method is performed by a central computation device.

25. The system of claim 23, wherein the method is performed by one or more distributed computation devices.

26. The system of claim 23, wherein a space of one or more of the available service links is reserved for each of the second plurality of service demands.

27. The system of claim 23, wherein a space of each of the available service links is not reserved for each of the second plurality of service demands.

\* \* \* \* \*